US006625541B1

(12) United States Patent
Shenoy et al.

(10) Patent No.: US 6,625,541 B1
(45) Date of Patent: Sep. 23, 2003

(54) METHODS FOR DOWNHOLE WAVEFORM TRACKING AND SONIC LABELING

(75) Inventors: Ramachandra Ganesh Shenoy, Danbury, CT (US); Henri-Pierre Valero, Tokyo (JP)

(73) Assignee: Schlumberger Technology Corporation, Ridgefield, CT (US)

( * ) Notice: Subject to any disclaimer, the term of this patent is extended or adjusted under 35 U.S.C. 154(b) by 225 days.

(21) Appl. No.: 09/591,405

(22) Filed: Jun. 12, 2000

(51) Int. Cl.$^7$ .................................................. G01V 1/00
(52) U.S. Cl. .......................................................... 702/6
(58) Field of Search ................................ 702/11, 12, 13, 702/6, 14, 17; 703/6, 10; 367/73, 69

(56) References Cited

U.S. PATENT DOCUMENTS

| | | | |
|---|---|---|---|
| 4,131,875 A | 12/1978 | Ingram | 340/15.5 |
| 4,594,691 A | 6/1986 | Kimball et al. | 367/32 |
| 4,672,588 A * | 6/1987 | Willen | 367/28 |
| 4,683,556 A | 7/1987 | Willis | 367/27 |
| 5,278,805 A | 1/1994 | Kimball | 367/32 |
| 5,539,704 A | 7/1996 | Doyen et al. | 367/73 |
| 5,587,966 A | 12/1996 | Kimball et al. | 367/31 |
| 5,594,706 A | 1/1997 | Shenoy et al. | 367/76 |
| 5,661,696 A | 8/1997 | Kimball et al. | 367/31 |
| 5,740,124 A | 4/1998 | Chunduru et al. | 367/73 |
| 6,147,929 A * | 11/2000 | Parra | 181/106 |

OTHER PUBLICATIONS

Schlumberger Log Interpretation Principles/Applications. Chapter 5 "*Porosity Logs*". Schlumberger Educational Services, Texas (1987).
Kurkjian, A. et al. "*Slowness Estimation from sonic Logging Waveforms*". Geoexploration, vol. 277, (1991) pp. 215–256.

Morris, C.F. et al. "*A New Sonic Array Tool for Full Waveform Logging*", SPE 13285, Society of Petroleum Engineers (1984).
Harrison, A.R. et al. "*Acquisition and Analysis of sonic Waveforms from a Borehole Monopole and Dipole Source. . .*" SPE 20557, (Sep. 1990) pp. 267–282.
Kimball, C.V. and Marzetta, T. L. "*Semblance Processing of Borehole Acoustic Array Data*". Geophysics, vol. 49 (Mar. 1984), pp. 274–281.
Kurien, Thomas. Chapter 3. "*Issues in the Design of Practical Multitarget Tracking Algorithms*". Multitarget–Multisensor Tracking: Applications and Advances, Alphatech, Inc. (1992) pp. 43–83.

* cited by examiner

*Primary Examiner*—Donald E. McElheny, Jr.
(74) *Attorney, Agent, or Firm*—David P. Gordon; Jody Lynn DeStefanis; William B. Batzer

(57) ABSTRACT

Methods for downhole waveform tracking and sonic labeling employ "tracking algorithms" and Bayesian analysis to classify STC waveforms. More particularly, according to the tracking part of the invention, a probability model is built to distinguish true "arrivals" (e.g. compressional, shear, etc.) from "false alarms" (e.g. noise) before the arrivals are classified. The probability model maps the "continuity" of tracks (slowness/time over depth) and is used to determine whether sequences of measurements are sufficiently "continuous" to be classified as tracks. The probability model is used to evaluate the likelihood of the data in various possible classifications (hypotheses). Prior and posterior probabilities are constructed for each track using the tracking algorithm. The posterior probabilities are computed sequentially and recursively, updating the probabilities after each measurement frame at depth k is acquired. The classification part of the invention determines the hypotheses with the maximum "posterior probability" according to Bayes' Theorem.

33 Claims, 9 Drawing Sheets

US 6,625,541 B1

METHODS FOR DOWNHOLE WAVEFORM TRACKING AND SONIC LABELING

This application is related to co-owned U.S. Pat. Nos. 5,661,696; 5,594,706; 5,587,966; and 5,278,805 the complete disclosures of which are hereby incorporated by reference.

INCORPORATION-BY-REFERENCE OF MATERIAL SUBMITTED ON A COMPACT DISC

A computer program listing of the preferred embodiment of the present invention has been separately submitted on a compact disc entitled "Computer Program Listing Appendix." The computer program listing contained therein is incorporate by reference herein in its entirety.

BACKGROUND OF THE INVENTION

1. Field of the Invention

The invention relates to the exploration of hydrocarbon wells. More particularly, the invention relates to methods for processing waveforms detected by a downhole tool, particularly a sonic logging tool.

2. State of the Art

Sonic logging is a well developed art, and details relating to sonic logging tools and techniques are set forth in "Porosity Logs"; *Schlumberger Log Interpretation Principles/Applications*, Chapter 5, Schlumberger Educational Services, Texas (1987); A. Kurkjian, et al., "Slowness Estimation from Sonic Logging Waveforms", *Geoexploration*, Vol. 277, pp.215–256 (1991); C. F. Morris et al., "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source . . . " SPE 20557, pp. 267–282. (Set. 1990); C. V. Kimball and T. L. Marzetta, "Semblance Processing of Borehole Acoustic Array Data", *Geophysics*, Vol. 49, pp. 274–281 (March 1984); U.S. Pat. No. 4,131,875 to Ingram; and U.S. Pat. No. 4,594,691 to Kimball et al., all of which are hereby incorporated by reference herein in their entireties. A sonic logging tool typically includes a sonic source (transmitter), and a plurality of receivers which are spaced apart by several inches or feet. In the borehole arts, a sonic signal is transmitted from a sonic source and received at the receivers of the borehole tool which are spaced apart from the sonic source, and measurements are made every few inches as the tool is drawn up the borehole. The sonic signal from the transmitter or source enters the formation adjacent the borehole, and the arrival times and perhaps other characteristics of the receiver responses are recorded. Typically, compressional (P-wave), shear (S-wave) and Stoneley (fluid) arrivals and waves are detected by the receivers and are processed either downhole or uphole. The information which is recorded is typically used to find formation parameters such as formation slowness (the inverse of sonic speed) and semblance, from which pore pressure, porosity, and other determinations can be made. In certain tools such as the DSI (Dipole Sonic Imager) tool (a trademark of Schlumberger), the sonic signals may even be used to image the formation.

Many different techniques for processing the sonic wave signals are known in the art in order to obtain information regarding the borehole and/or formation. Typically, the processing involves digitizing the received signal at a desired sampling rate and then processing the digitized samples according to desired techniques. Examples may be found in U.S. Pat. No. 4,594,691 to Kimball et al. and the references cited therein, as well as in articles such as A. R. Harrison et al., "Acquisition and Analysis of Sonic Waveforms From a Borehole Monopole and Dipole Source . . . " SPE 20557, pp. 267–282 (Sept. 1990).

For some time now, compressional slowness has been computed using Slowness-Time Coherence (STC) processing. C. V. Kimball and T. L. Marzetta, "Semblance Processing of Borehole Acoustic Array Data", *Geophysics*, Vol. 49, pp. 274–281 (March 1984). In STC processing, the measured signal is time window "filtered" and stacked, and a semblance function is computed. The semblance function relates the presence or absence of an arrival with a particular slowness and particular arrival time. If the assumed slowness and arrival time do not coincide with that of the measured arrival, the semblance takes on a smaller value. Consequently, arrivals in the received waveforms manifest themselves as local peaks in a plot of semblance versus slowness and arrival time. These peaks are typically found in a peak-finding routine discussed in the aforementioned article by Kimball and Marzetta.

Prior art FIG. 1 illustrates an array of eight waveforms recorded by a sonic tool at a given depth. Such an array is referred to as "a frame". Each frame is processed using STC. The first stage in STC is stacking or beamforming of the waveform, to compute semblance, a two-dimensional function of slowness and time which is illustrated in prior art FIG. 2 and is generally referred to as the STC slowness-time plane. The semblance function is given by Equation (1) where $x_i(t)$ is the waveform recorded by the i-th receiver of an M-receiver equally spaced array with inter-receiver spacing $\Delta z$. The array of waveforms $\{x_i(t)\}$ acquired at depth z constitutes a single frame of data.

$$\rho(\tau, p) = \frac{\int_{\tau-\frac{T}{2}}^{\tau+\frac{T}{2}} \left| \sum_{k=0}^{M-1} x_i(t - k\Delta zp) \right|^2 dt}{M \int_{\tau-\frac{T}{2}}^{\tau+\frac{T}{2}} \sum_{k=0}^{M-1} |x_i(t - k\Delta zp)|^2 dt} \quad (1)$$

The semblance $\rho(\tau,p)$ for a particular depth z is a function of time $\tau$ and slowness p. More particularly, it is the quotient of the beamformed energy output by the array at slowness p (the "coherent energy") divided by the waveform energy in a time window of length T (the "total energy").

The second step in STC processing is to identify peaks in the slowness-time plane with waveform arrivals propagating across the array. Peaks are identified by sweeping the plane with a peak mask. The peak mask is a parallelogram having a slope which corresponds to the transmitter-receiver spacing. A peak is defined as a maximum within the mask region. For each peak, five variables are recorded: the slowness coordinate p, the time coordinate $\tau$, the semblance $\rho(\tau,p)$, the coherent energy (the numerator of Equation 1), and the total energy (the denominator of Equation 1).

The third step in STC processing is called "labeling" or "classification" and this involves a classification of the peaks found in the second step. The peaks will be classified as corresponding to compressional (P-wave), shear (S-wave) or Stoneley arrivals. Correct classification of the peaks is a difficult process for a number of reasons. Some of the peaks may correspond to spatial aliases rather than the arrival of real waveforms. Some of the peaks may actually be two peaks close together. In general, the problem with state-of-the-art labeling is that small changes in data can cause large differences in the final classification. For example, one of the measures used to classify peaks is the "slowness projection" which is given by Equation (2) and illustrated in prior art FIG. 3. The slowness projection I(p,z) is essentially slowness as a function of depth z which is found at maximum semblance over time τ.

$$I(p, z) = \max_{\tau} \rho(\tau, p, z) \quad (2)$$

The slowness projection (FIG. 3) is currently used as a qualitative check on the slowness logs (prior art FIG. 4) output by the labeling function. Bright tracks in the slowness projection may be identified with the arrival of waveforms. The logs are superimposed on the slowness projections to determine whether the logs are consistent with the slowness projections. In certain regions where the arrival is weak or absent, the intensity of the track diminishes or becomes diffuse. For example, as shown in FIG. 4, the compressional and shear arrivals in a particular borehole seem to vanish at about 3400 feet and deeper. According to actual state-of-the-art algorithms, the classification of shear slowness fails at approximately 3410 feet and the classification of compressional arrival fails at approximately 3425 feet. While abrupt changes in the output of the labelling function may be obvious to the eye, they are difficult to detect automatically.

In addition, the following documents are incorporated herein by reference in their entirety: (1) Harvey, A. C., Time Series Models, MIT Press (1994), Chapter 4 and (2) Scharf, L., Statistical Signal Processing, Wiley (1991), pages 306–311 and 464–469.

SUMMARY OF THE INVENTION

It is therefore an object of the invention to provide methods for more accurately labeling sonic waveform information.

It is also an object of the invention to provide methods for tracking sonic measurements into sequences which may be identified as belonging to a single arrival or "track".

It is a further object of the invention to provide methods for classifying tracks as representative of a particular type of arrival.

It is another object of the invention to provide methods of waveform analysis which can be performed automatically.

In accord with these objects which will be discussed in detail below, the methods of the present invention include a tracking component and a classification component. More particularly, the methods employ "tracking algorithms" and Bayesian analysis to classify sonic waveforms subjected to STC processing. According to the tracking part of the invention, a probability model is built to distinguish true "arrivals" (e.g. compressional, shear, etc.) from "false alarms" (e.g. noise) before the arrivals are classified. The probability model maps the "continuity" of tracks (slowness/time over depth) and is used to determine whether sequences of measurements are sufficiently "continuous" to be classified as tracks. The probability model is used to evaluate the likelihood of the data in various possible classifications (hypotheses). The classification part of the invention seeks to find the hypothesis with the maximum "posterior probability" according to Bayes' Theorem. Prior probabilities and posterior probabilities are constructed for each track using the tracking algorithm and the posterior probabilities are evaluated by the classification part of the method. The posterior probabilities are computed sequentially and recursively, updating the probabilities after each measurement frame at depth k is acquired.

According to a presently preferred embodiment of the tracking algorithm, a data set from each frame includes the measurements paired with an indication of the number of measurements in each frame. The measurements are considered to be "continuous" whereas the number of measurements is discrete. Separate probability models are constructed for the continuous and discrete data.

The discrete probability model is based upon the "model order" O, which is the number of tracks, and the number of measurements implied by the N hypotheses, where N is the sum of the number of tracks observed in the frame and the number of false alarm measurements. Hypotheses are calculated for each frame in a set of k frames where the hypotheses for each frame is a function of the current model order, the previous model order implied by the ancestor hypotheses, and the number of measurements implied by the previous frames. The hypotheses completely determine the possible classifications of measurements in the current frame and their relationship to measurements in the previous frame. The tracks are ranked according to increasing slowness. All of the measurements are classified as to which track they belong and tracks containing no measurements are so classified. A matrix of the classifications is created in which each column corresponds to a track and each row corresponds to a measurement. Probabilities are assigned to each classification based on the model orders and the number of tracks observed as well as the number of false alarms, the number of false alarms being modeled as a Poisson distribution with a known mean. Another matrix is created where the first column specifies which tracks in the previous frame may correspond to track 1 in the current frame, the second column specifies which tracks in the previous frame may correspond to track 2 in the current frame, etc. Probabilities are assigned to the cells of the second matrix based on the classifications, the track assignments, and the probability models described above. A prior probability model for the discrete hypotheses together with the data likelihood are then created based on the foregoing.

The continuous probability models (the likelihood that a sequence of measurements is sufficiently continuous to qualify as a track) are based on the slowness-time coordinates of every peak. A Kalman filter model is used for the slowness-time coordinates. Slownesses are correlated across depth by modeling the sequence of slownesses as the output of an ARMA filter with known coefficients, driven by white Gaussian noise. The slownesses are not assumed to be correlated with times. The actual probability computations are implemented with Kalman filters. Each slowness-time pair from an STC peak is modeled as a two-dimensional vector. A two-dimensional Kalman filter is made from two one-dimensional filters, one for the slowness sequences and one for the time sequences. No correlation between slowness and time is assumed for this part of the method. The Kalman equations enable the evaluation of the likelihood of the sequence of measurements forming a track given the prior continuity model for the track. At each depth, Kalman prediction gives the two-dimensional Gaussian probability distribution of slowness-time data given the past measurements (previous data). The likelihood of the data belonging to the track is computed by evaluating the Gaussian distribution at the slowness-time point specified by the data. A Kalman update of the state and covariance using the data at this depth predicts the two-dimensional probability distribution of the slowness-time at the next depth.

In the classification part of the method, the discrete and the continuous parts of the probability model are subjected to Bayesian analysis. More particularly, the posterior probabilities for each frame are evaluated using Bayes' Theorem and the most probable hypothesis is selected to classify the tracks. Three different probability models may be used: "pessimistic", "forward", and "forward/backward". Pessimistic classification uses only the data in the current frame for classification to compute posterior probability. Forward classification incorporates information provided by all data up to and including the current frame. Forward/backward classification, which is presently preferred, incorporates information from some number of prior frames and some number of subsequent frames. Forward classification can operate in real time with substantially no latency. Forward/backward classification can be run with a latency depending on the number of frames included in each classification. Several assumptions are made to simplify the analyses.

Additional objects and advantages of the invention will become apparent to those skilled in the art upon reference to the detailed description taken in conjunction with the provided figures.

DETAILED DESCRIPTION OF THE PREFERRED EMBODIMENTS

As mentioned above, the methods of the present invention employ "tracking algorithms" and Bayesian analysis to classify sonic waveforms subjected to STC processing. The tracking algorithm attempts to associate measurements made at one depth with measurements made at subsequent depths. For example, let $Z^k$ represent the set of all measurements through depth k as shown in Equation (3).

$$Z^k = \{Z(0), Z(1), \ldots, Z(k)\} \quad (3)$$

Figure 1:
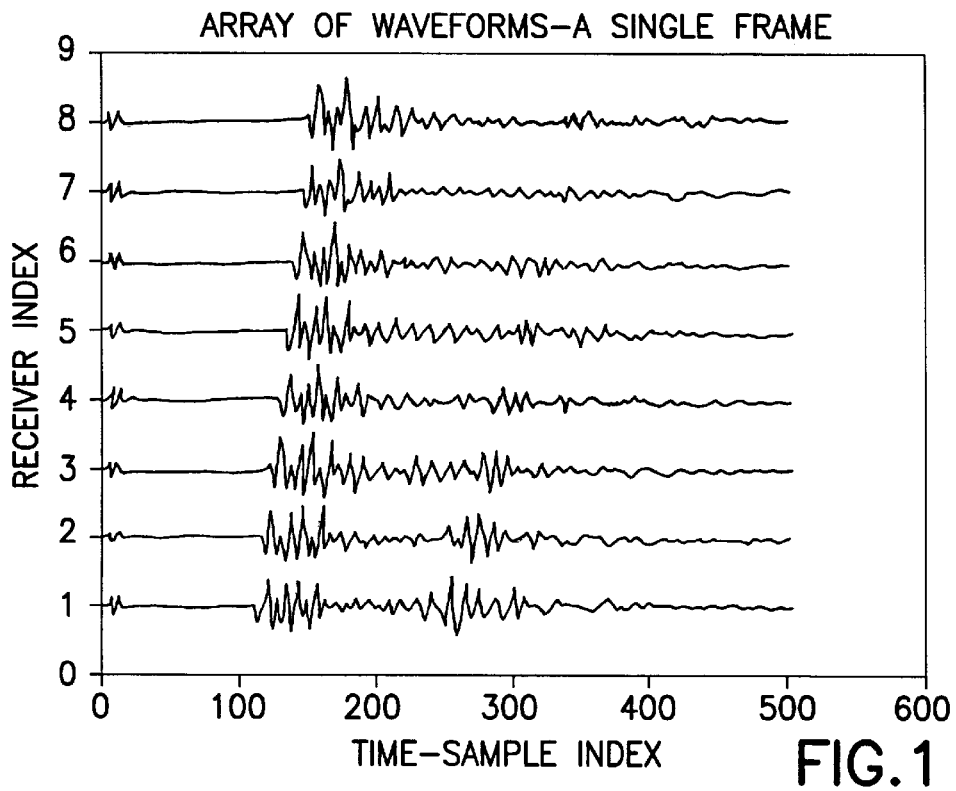
FIG. 1 illustrates a prior art array of eight waveforms recorded by a sonic tool at a given depth.
Figure 2:
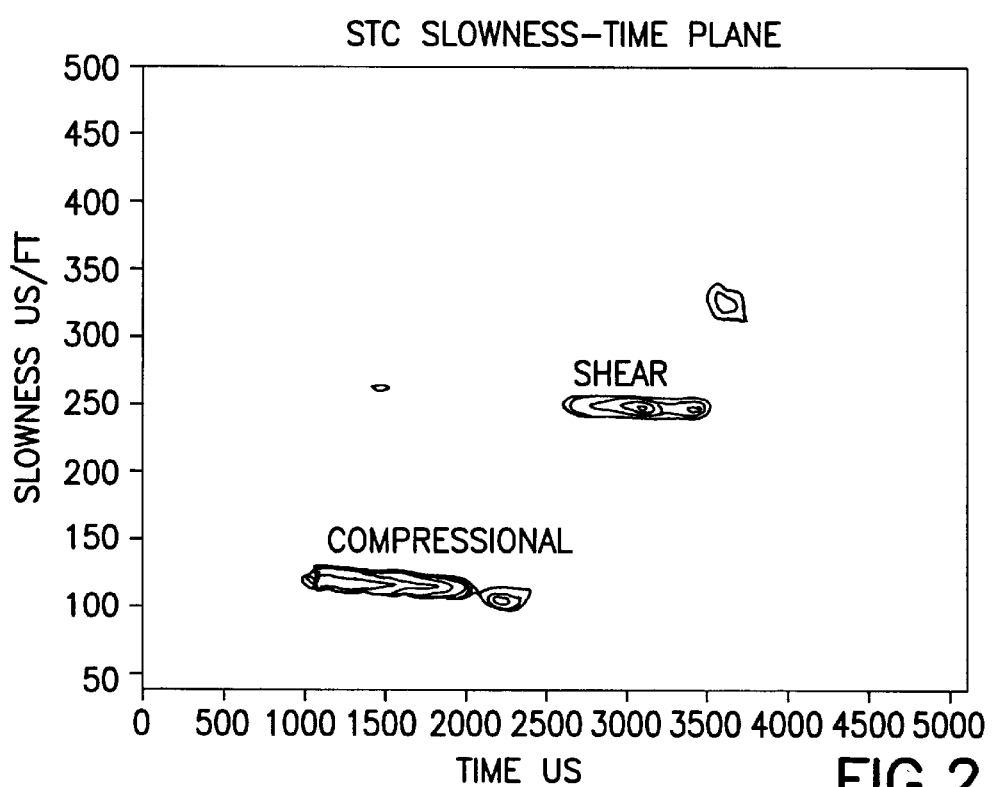
FIG. 2 illustrates a prior art stacking or beamforming of the waveforms of FIG. 1, to compute semblance, a two-dimensional function of slowness and time.
Figure 3:
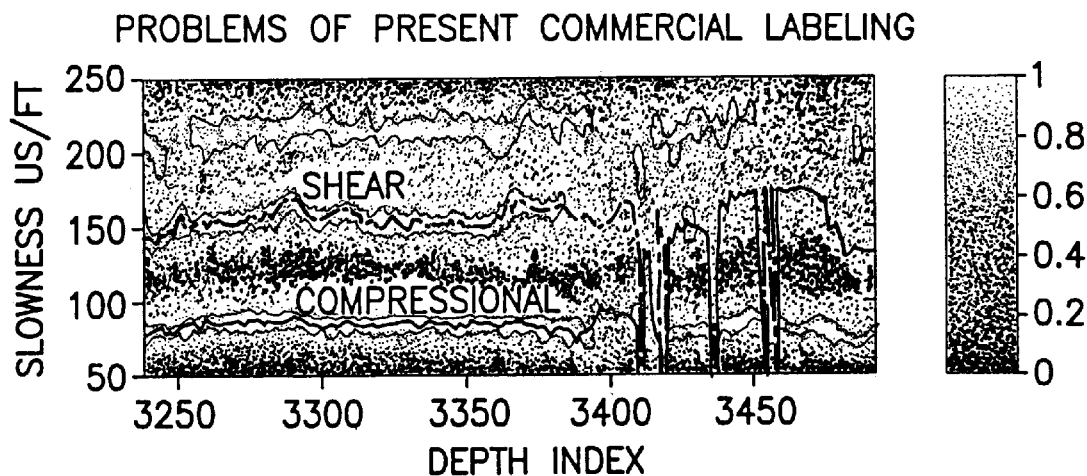
FIG. 3 illustrates a prior art slowness projection of compressional and shear arrivals.
Figure 4:
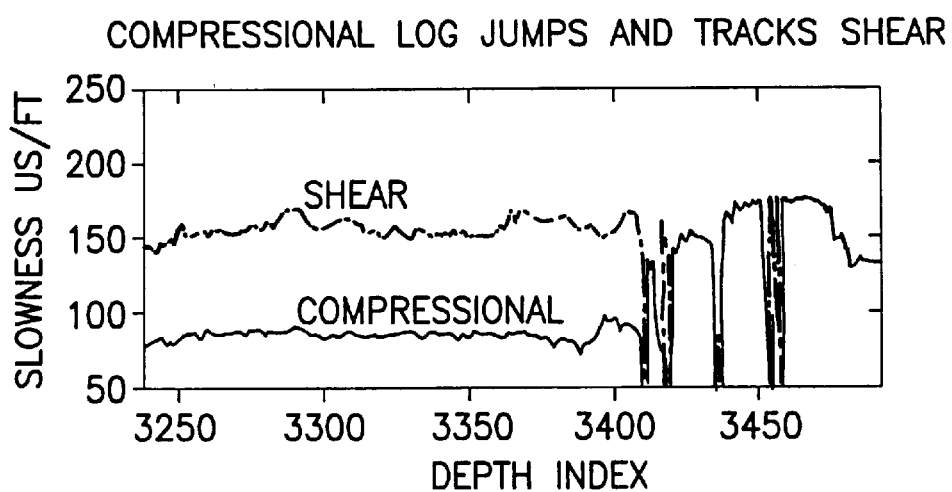
FIG. 4 illustrates a prior art slowness log of compressional and shear arrivals.
Figure 5:
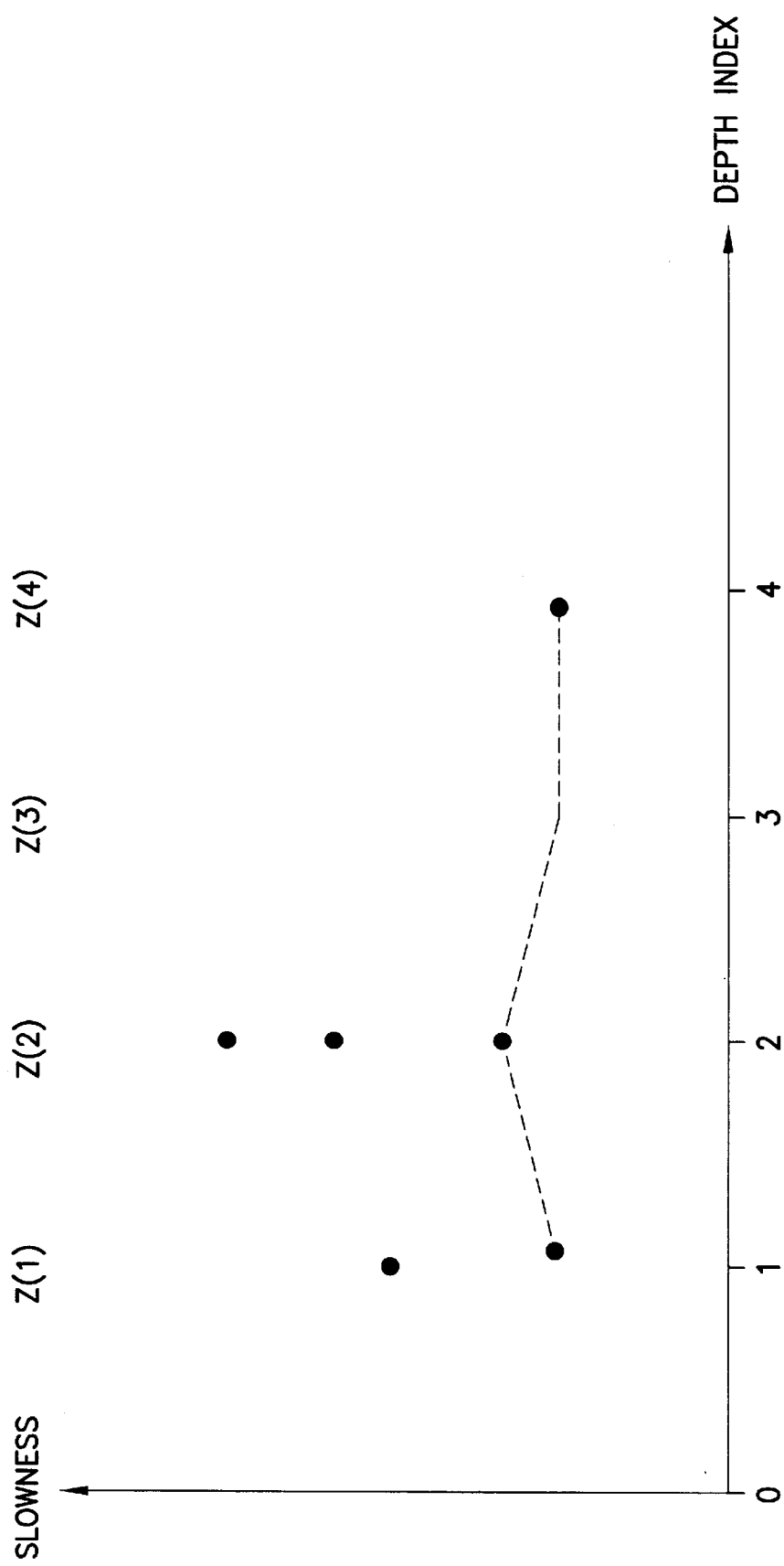
FIG. 5 is a simplified graph of slowness measurements over four depths illustrating a possible track with a dashed line.

If three slowness peaks (as determined by STC processing) are recorded at depth k, the measurements in Z(k) will include three slownesses, three arrival times, and three semblances. FIG. 5 illustrates a simplified sequence of slowness measurements at four depths. As shown in FIG. 5, measurements are missing at depth "3".

For each depth, i.e., for each set of measurements at each depth, hypotheses (e.g. i number of hypotheses) can be made regarding all of the possible interpretations of the measurements. Moreover, hypotheses can be made for all of the possible interpretations of all of the measurements taken up through to depth k. Equation (4) illustrates the $i^{th}$ hypothesis $q_i^k$ for the measurements made up through depth k as a set of constituent hypotheses for the measurements at each depth 0-k.

$$q_i^k = \{q_i(1), \ldots, q_i(k)\} \quad (4)$$

Each $q_i(j)$ specifies how measurement Z(j) at the $j^{th}$ depth are assigned to tracks and how the tracks at depth j are related to the tracks at depth j−1 and depth j+1. The number of tracks is not assumed to be constant. Tracks may be initiated and terminated over depths and it is important to be able to determine whether a track called Track 1 at frame j is the same as the track called track 2 at frame j+1. The probability model for a track uses certain parameters, such as slowness and time. The parameters are denoted generically for each depth as $\mu(k)$, the parameter values at depth k.

The purpose of the tracking algorithm is to compute posterior probabilities from prior probability models and the data likelihood. At this point it is useful to provide some explanation about "posterior probabilities", "prior probability models" and "data likelihood" as those terms relate to Bayesian analysis.

Bayesian analysis takes into account conditional probabilities and provides a rule for quantifying confidence (beliefs or probability) based on evidence. Bayes theorem, known as the inversion formula, is listed below as Equation (5).

$$P(H|e) = \frac{P(e|H)P(H)}{P(e)} \quad (5)$$

Equation (5) states that the probability of (or belief in) hypothesis H upon obtaining evidence e is equal to the probability (or degree of confidence) that evidence e would be observed if H is true, multiplied by the probability of H prior to learning evidence e (the previous belief that H is true), divided by the probability of evidence e. P(H|e) is referred to as the posterior probability. P(H) is referred to as the prior probability. P(e|H) is referred to as the likelihood; and P(e) is a normalizing constant.

The inversion formula can be used to quantify confidence based on multiple pieces of evidence. For example, with N pieces of evidence, the inversion formula would take the form shown in Equation (6).

$$P(H|e_1, e_2, \ldots, e_N) = \frac{P(e_1, e_2, \ldots, e_N|H)P(H)}{P(e_1, e_2, \ldots, e_N)} \quad (6)$$

It will be appreciated that a full joint distribution of probabilities based on N pieces of evidence will have $2^N$ values. If, however, it is known that each piece of evidence is independent of the others (marginal independence), the inversion formula can be reduced to the form shown in Equation (7) and the distribution can be reduced in size to N number of values.

$$P(H|e_1, e_2, \ldots, e_N) = \frac{P(H)\prod_i P(e_i|H)}{\prod_i P(e_i)} \quad (7)$$

The posterior probability of interest to the present invention is $P(q_i^k|Z^k)$, i.e. the posterior probability of the hypothesis $q_i^k$ given the measurements $Z^k$. This probability enables the selection of the most probable classification of measurements into tracks and false alarms.

The computations of this posterior probability is preferably performed in a sequential fashion, recursively updating the probabilities after each measurement frame at depth k is acquired. As shown in Equations (8) and (9), $q_i^k$ is the $i^{th}$ hypothesis for measurements $Z^k$ up through depth k and this hypothesis can be decomposed as $q_i(k)$, the hypothesis for the measurements $Z(k)$ at depth k, and $q_{l(i)}^{k-1}$, the $l(i)^{th}$ hypothesis for measurements $Z^{k-1}$ through to depth k−1.

$$q_i^k = \{q_i(k), q_{l(i)}^{k-1}\} \quad (8)$$

$$Z^k = \{Z(k), Z^{k-1}\} \quad (9)$$

Substituting Equations (8) and (9) in the inversion formula, Equation (5), yields the first posterior probability of interest $P(q_i^k|Z^k)$ as shown in Equation (10) where $C_k$ is a normalizing constant obtained by summing the numerator in Equation (10) over i.

$$P(q_i^k | Z^k) = \frac{P(Z(k) | q_i^k, Z^{k-1}) P(q_i(k) | q_{l(i)}^{k-1}, Z^{k-1}) P(q_{l(i)}^{k-1} | Z^{k-1})}{C_k} \quad (10)$$

Equation (10) is the general probability equation, with no simplifying assumptions. In order to solve Equation (10), it is necessary to specify the detailed probability models used to generate the terms $P(Z(k)|q_i^k, Z^{k-1})$ and $P(q_i(k)|q_{l(i)}^{k-1}, Z^{k-1})$. The last term in the numerator of Equation (10) will be assumed to be available from processing hypotheses for the measurements through to depth k−1.

According to a presently preferred embodiment of the tracking algorithm, a data set Z(k) from each frame includes the measurements C(k) paired with an indication N(k) of the number of measurements in each frame. The measurements C(k) are considered to be "continuous" whereas the number of measurements N(k) is discrete. Separate probability models are constructed for the continuous and discrete data. The discrete and continuous probability models are used to compute the terms needed to solve Equation (10).

The discrete probability model is based upon the "model order" O, which is the number of tracks, and the number of measurements implied by the N hypotheses, where N is the sum of the number of tracks observed in the frame plus the number of false alarm measurements. The model order implied by the $q_i(k)$ for the $k^{th}$ frame is denoted $O_i$ and the model order implied from the previous frame k−1 is $O_{l(i)}$. The number of measurements implied by $q_i(k)$ is denoted $N_i$ which is not to be confused with the number of measurements N(k) contained in the data at the $k^{th}$ frame.

Hypotheses are calculated for each frame in a set of k frames where the hypotheses for each frame are a function of the current model order, the previous model order implied by the ancestor hypotheses, and the number of measurements implied by the previous frames. Each set of hypotheses completely describes the possible classifications of measurements in the current frame and their relationship to measurements in the previous frame. The current model order $O_i$ and the number of measurements $N_i$ determine the number of ways in which $N_i$ measurements can be classified as false alarms and arrivals, up to a maximum of $O_i$ arrivals, in the current frame k. The notation $g_r(O_i, N_i)$ is the $r^{th}$ way of classifying $N_i$ measurements as false alarms and arrivals, up to a maximum of $O_i$ arrivals.

According to the presently preferred embodiment, the tracks are ranked according to increasing slowness. All of the measurements are classified as to which track they belong, and tracks containing no measurements are so classified. A measurement can belong to only one track and only one measurement can belong to a track at a depth k. (Dual arrivals are handled by the classification algorithm described hereinafter, and not by the tracking algorithm.) Any measurement which does not belong to a track is classified as a false alarm.

A matrix of the classifications is created in which each column corresponds to a track and each row corresponds to a measurement. The matrix is similar to classifying combinations of integers 1, . . . , $N_{i+1}$, selecting $O_i$ at a time. The matrix below (Table 1) illustrates a simple example where $O_i=2$ and $N_i=3$.

TABLE 1

| | |
|---|---|
| Measurement 1 belongs to Track 1 | Measurement 2 belongs to Track 2 |
| Measurement 1 belongs to Track 1 | Measurement 3 belongs to Track 2 |
| Measurement 1 belongs to Track 1 | No Measurement belongs to Track 2 |
| Measurement 2 belongs to Track 1 | Measurement 3 belongs to Track 2 |
| Measurement 2 belongs to Track 1 | No Measurement belongs to Track 2 |
| Measurement 3 belongs to Track 1 | No Measurement belongs to Track 2 |
| No Measurement belongs to Track 1 | Measurement 1 belongs to Track 2 |
| No Measurement belongs to Track 1 | Measurement 2 belongs to Track 2 |
| No Measurement belongs to Track 1 | Measurement 3 belongs to Track 2 |
| No Measurement belongs to Track 1 | No Measurement belongs to Track 2 |

Table 1 has ten rows with the last row representing $g_r(O_i, N_i)$. The probability assigned to each classification is denoted $P(g_r|O_i, N_i)$. In an exemplary embodiment of the invention, it is assumed that each of the $O_i$ arrivals is independent of any of the others and of the false alarms. If $O_i$ arrivals are presumed, then each arrival has a known probability p of actually appearing in the current frame, and a probability of 1-p of not appearing when it is expected. False alarms are modeled as independent and the number of false alarms are modeled as a Poisson distribution with a known mean λ. Thus, if K of the $O_i$ arrivals are actually present in the possible classification $g_r(O_i, N_i)$, then there are K arrivals and $N_i$-K false alarms. According to this exemplary embodiment, the probability of the classification is shown by Equation (11).

$$P(g_r | O_i, N_i) = p^K (1-p)^{O_i - k} \frac{e^{-\lambda} \lambda^{N-K}}{(N-K)!} \quad (11)$$

The current model order $O_i$ and the previous model order $O_{l(i)}$ determine the number of ways in which $O_i$ arrivals in the current frame can be assigned to $O_{l(i)}$ arrivals in the previous frame. In other words, the relationship between the measurements in the current frame k and the measurements in the previous frame k−1 is an important aspect of the tracking algorithm. The notation $h_s(O_i, O_{l(i)})$ is used to denote the $s^{th}$ possible way of assigning (correlating) $O_i$ tracks in the current frame k to $O_{l(i)}$ tracks in the previous frame k−1. These possible ways are arranged in a second matrix. The rules for generating $h_s(O_i, O_{l(i)})$ are similar to those used to generate the first matrix described above. The tracks are arranged in order of increasing slowness and, according to a preferred embodiment, the tracks are not allowed to cross. For example, if track 1 in the current frame is assigned to track 2 in the previous frame, then track 2 in the current frame cannot be assigned to track 1 in the previous frame. If $O_i = O_{l(i)}$, it is assumed that all of the tracks in the previous frame continue into the current frame. If $O_i < O_{l(i)}$, then some tracks must be terminated. If $O_i > O_{l(i)}$, then new tracks must be initiated. A simple example of the second matrix is illustrated in Table 2 where $O_i=2$ and $O_{l(i)}=3$. Each row in the matrix lists a possible way of correlating the three tracks in the prior frame with the two tracks in the current frame.

TABLE 2

| | |
|---|---|
| Track 1 in frame k-1 is track 1 in frame k | Track 2 in frame k-1 is track 2 in frame k |
| Track 1 in frame k-1 is track 1 in frame k | Track 3 in frame k-1 is track 2 in frame k |
| Track 2 in frame k-1 is track 1 in frame k | Track 3 in frame k-1 is track 2 in frame k |

If $O_i > O_{I(i)}$, the possible correlations are too complex and the presently preferred embodiment of the invention assumes that all of the tracks continue from the previous frame into the current frame in increasing order of slowness and a first group of tracks is thus identified. New tracks are initiated in the current frame for $O_{I(i)+1}$ through $O_i$. The new tracks are ordered per increasing slowness relative to each other but not relative to the first group of tracks unless they are all slower than the tracks in the first group. After the two groups of tracks are identified, the tracks are reordered in increasing order of slowness. Those skilled in the art will appreciate, however, that different assumptions could be made for computational convenience without departing from the spirit of the invention.

After the different ways of matching tracks are enumerated, it is assumed that all of the ways are equally likely. Thus, if there are $\psi(O_i, O_{I(i)})$ different possible ways of matching tracks $h_s(O_i, O_{I(i)})$, each has the probability of $1/\psi(O_i, O_{I(i)})$ This is stated in Bayesian terms in Equation (12).

$$P(h_s \mid O_i, O_{I(i)}) = \frac{1}{\psi(O_i, O_{I(i)})} \quad (12)$$

The classifications $g_r(O_i, N_i)$ and the track assignment $h_s(O_i, O_{I(i)})$, together with the probability models of Equations (11) and (12) form the basis for the probability computation of Equation (10). Equations (13) through (16) illustrate how the probability of a particular hypothesis is related to $g_r(O_i, N_i)$ and $h_s(O_i, O_{I(i)})$ together with the probability models of Equations (11) and (12)

$$P(q_i^k) = P(q_i(k), q_{I(i)}^{k-1}) \quad (13)$$

$$P(q_i^k) = P(q_i(k) \mid q_{I(i)}^{k-1}) P(q_{I(i)}^{k-1}) \quad (14)$$

$$P(q_i^k) = P(g_r, h_s, O_i, N_i \mid O_{I(i)}) q_{I(i)}^{k-1}) P(q_{I(i)}^{k-1}) \quad (15)$$

$$P(q_i^k) = P(g_r \mid O_i, N_i) P(h_s \mid O_i, O_{I(i)}, q_{I(i)}^{k-1})) P(q_{I(i)}^{k-1}) \quad (16)$$

Equations (13) and (14) are identities. Equation (15) illustrates substitution of a specific model for the hypotheses $q_i(k)$, $q_{I(i)}^{k-1}$, namely that the form of each hypothesis is determined by the current model order $O_i$ and the number of measurements $N_i$ implied by $q_i(k)$ and by the previous model order $O_{I(i)}$ implied by $q_{I(i)}^{k-1}$. Any of the $g_r(O_i, N_i)$ can now be combined with any of the $h_s(O_i, O_{I(i)})$ to form a valid $q_i(k)$ that can be appended to $q_{I(i)}^{k-1}$. Equation (16) illustrates the assumption that $g_r$ and $h_s$ are independent and the explicit dependence of $g_r$ on $O_i$, $N_i$, and $h_s$. Equation (16) also illustrates the finite probability of changing from the model order $O_{I(i)}$ in the frame k−1 to the model order $O_i$ in frame k. As mentioned above, it is assumed that all model orders are equally likely.

Equation (16) together with Equations (11) and (12) complete the description the prior probability model for the discrete hypotheses. The discrete and continuous likelihoods are assumed to be independent. The prior probability model for the discrete hypotheses, together with the data likelihood completes the description of the discrete part of the probability model. As suggested above, the data likelihood is 1 if $N_i = N(k)$, and 0 otherwise. Thus, it has been shown how to compute the middle term of the numerator of Equation (10) and the discrete part of $P(Z(k) \mid q_i(k), q_{I(i)}^{k-1}, Z^{k-1})$ shown as the second term on the right side of Equation (17).

$$P(Z(k) \mid q_i(k), q_{I(i)}^{k-1}, Z^{k-1}) = P(C(k) \mid q_i(k), q_{I(i)}^{k-1}, Z^{k-1}) P(N(k) \mid q_i(k), q_{I(i)}^{k-1}, Z^{k-1}) \quad (17)$$

The continuous probability models (the likelihood that a sequence of measurements is sufficiently continuous to qualify as a track) are based on the slowness-time coordinates of every peak as well as the semblance. Equation (8) completely describes sequences of measurements which belong to the same track. To assess the likelihood that a sequence of measurements is sufficiently continuous to qualify as a real track, the invention provides a probability model for the continuous part C(k) of the data. As mentioned above C(k) includes the slowness-time coordinates of every peak as well as the semblance. According to the invention, a Kalman filter model is used for the slowness-time coordinates. In the preferred embodiment, the continuous probability models do not utilize the semblance data.

According to the invention, it is assumed that the sequences of slownesses and times are independent (uncorrelated) Gaussian random processes. At each depth the slowness and time are Gaussian random variables and each slowness-time pair forms a Gaussian random vector. Slownesses are correlated across depth by modeling the sequence of slownesses as the output of an ARMA filter with known coefficients, driven by white Gaussian noise. Similarly, times are correlated across depth by modeling the sequence of times as the output of an ARMA filter with known coefficients, driven by white Gaussian noise. Initially, the slownesses are not assumed to be correlated with times. The actual probability computations are implemented with Kalman filters. A background in Kalman filters can be found in Harvey, A. C., Time Series Models, MIT Press (1994) (hereinafter "Harvey"), which is incorporated by reference herein in its entirety. See, in particular, Chapter 4, attached hereto as Appendix A. Further background can be found in Scharf, L., Statistical Signal Processing, Wiley (1991) (hereinafter "Scharf", which is incorporated by reference herein in its entirety. See, in particular, pages 306–311 and 464–469, attached hereto as Appendix B.

Each slowness-time pair from an STC peak is modeled as a two-dimensional vector. Each ARMA filter is given a state-space representation as described in Scharf. The two state-space representations (one for slowness, one for time) are joined together in a single state-space representation for slowness and time. Kalman state transition matrices, measurement matrices, and covariance matrices are formed as described by Harvey and Scharf. For example, the z-transform and filter coefficients are given by Equation (18) using the same notation as Harvey.

$$H(z) = \frac{b_o + b_1 z^{-1} + \ldots + b_p z^{-p}}{a_0 + a_1 z^{-1} + \ldots + a_p z^{-p}} \quad (18)$$

Utilizing the same notation as Harvey, Equations (19) and (20) represent the state update and measurement update equations, respectively.

$$a_{t+1} = T a_t + c + R_t \eta \quad (19)$$

$$y_t = Z a_t + d + \epsilon \quad (20)$$

Equations (19) and (20) are simplified according to the invention by assuming that T, c, d, ε, η, and R are all independent of time (depth in the case of the invention). This assumption can be made because there is no a priori knowledge that distinguishes one depth from any other.

The specific state-space representation used for a scalar ARMA filter with coefficients as given by Equation (18) and with a mean stationary process $\mu$ is exemplified by Equations (21) through (25).

$$T = \begin{pmatrix} 1 & 0 & \cdots & 0 \\ 0 & 1 & \cdots & \vdots \\ \vdots & 0 & \ddots & \vdots \\ -a_{p-1} & -a_{p-2} & \cdots & -a_1 \end{pmatrix} \quad (21)$$

$$c = \begin{pmatrix} 0 \\ \vdots \\ 0 \\ \mu \end{pmatrix} \quad (22)$$

$$R_t = \begin{pmatrix} 0 \\ \vdots \\ 0 \\ 1 \end{pmatrix} \quad (23)$$

$$Z = (b_1 - b_0 a_0 \, b_2 - b_0 a_1 \, \ldots \, b_p - b_0 a_p) \quad (24)$$

$$d = b_0 c \quad (25)$$

The initial mean $a_0$ and the covariance $P_0$ for this Kalman filter are given by Equations 2.11a and 2.11b at page 88 of Harvey which depend on T, c, $R_t$, and Q, where Q is the noise variance.

According to the invention a two-dimensional Kalman filter is made from two one-dimensional filters, one for the slowness sequences and one for the time sequences. According to the presently preferred embodiment, no correlation between slowness and time is assumed for this tracking part of the invention. The Kalman equations enable the evaluation of the likelihood of the sequence of measurements $C^k = \{C(k), \ldots, C(1)\}$ forming a track given the prior continuity model for the track which is given by Equation (26).

$$P(C^k|I) = P(C(k)|C^{k-1})P(C(k-1)|\backslash]vC^{k-2},I) \ldots P(C(2)|D^1, I)P(D(1)|I) \quad (26)$$

In Equation (26), $P(C^k|I)$ denotes the probability of the continuous measurements from depth O through depth k (see, e.g. FIG. 5) forming a track (the broken line in FIG. 5) given the prior information I, which is the continuity model for a track. By successive conditioning, $P(C^k|I)$ is decomposed into the product of terms shown on the right hand side of Equation (26), each of which is evaluated by successive Kalman prediction and update of the state and covariance. At each depth $0 < j \leq k$, Kalman prediction gives the 2D Gaussian probability distribution of the slowness-time data at depth j, given the past measurements $C^{j-1}$. The likelihood of the data C(j) belonging to the track is computed by evaluating this Gaussian distribution at the slowness-time point specified by C(j). A Kalman update of the state and covariance using C(j) predicts the 2D Gaussian probability distribution of slowness-time at depth j+1. From the foregoing, those skilled in the art will appreciate that all of the information needed to compute Equation (10) is now available and the tracking algorithm is complete.

According to a presently preferred embodiment, the tracking algorithm is implemented with an "off-the-shelf" software package called MATLAB® which is available from The Math Works, Natick, Mass. A program listing of the presently preferred embodiment of the software is attached hereto as Appendix C. Since the tracking algorithm needs to evaluate the probabilities of different sequences, it requires a systematic method of enumerating different sequences of measurements which might form candidate tracks. According to the invention, this is accomplished with a data structure which is referred to as a "target tree".

As mentioned above, the parameter $\lambda$ is the mean number of false alarms per depth. The level of the uniform distribution in the slowness time plane is referred to as the parameter pfa. Utilizing the MATLAB® software, both these parameters are set in the m-file, engineer_params.m, an m-file containing parameters that are intended to be set by the Product Centers, not a user. Thus, if an hypothesis $g_r(O_i, N_i)$ specifies N false alarms, the contribution to the likelihood $P(Z(k)|q_i^k, Z^k)$ is that it should be multiplied by the factor $(\text{pfa})^N$. However, the contribution to the likelihood only makes sense if the underlying hypothesis specifies that there are N false alarms in the measurements. If that is the case, then there is a contribution to the hypothesis probability $P(q_t(k)|q_{I(i)}^{k-1}, Z^{k-1})$ that it should be multiplied by the factor $$\frac{e^{-\lambda}\lambda^N}{N!}.$$

If measurements are not false alarms, they belong to tracks. A track is defined by a sequence of measurements over depth. As mentioned above, the probability model for a track attempts to assign higher probability to sequences that are smoothly varying in slowness and time, and lower probability to highly discontinuous sequences. Since it is possible to form many sequences from the measurements that constitute candidate tracks, it is necessary, as mentioned above, to have a systematic method for enumerating the possible sequences of measurements that comprise likely tracks, and for computing the likelihoods of these candidate tracks, for use in the posterior probability computation for hypotheses. According to the invention, the tracking algorithm uses a data structure called a "target tree". After the detailed continuity model for evaluating the likelihood of a sequence of measurements forming a track is described, the target tree data structure and its associated variable target leaves are described. FIG. 5 is a diagram illustrating a single sequence of measurements that might comprise a single track. For the purposes of illustration, slowness is plotted against depth, but it is understood that every measurement at each depth comprises a triplet: slowness, time and semblance. As illustrated in FIG. 5, measurements may be absent at any particular depth.

As mentioned above, the slowness-time coordinates are determined with a Kalman filter. Utilizing the MATLAB® software, the functions "kalm_init.m, kalm_pred.m, and kalm_upd.m are used to perform the following tasks:

kalm_init.m initializes the Kalman state vector and covariance matrix (very weak prior information), and returns the joint slowness-time Kalman parameters;

kalm_pred.m performs Kalman prediction of state and covariance for depth k, given a state and covariance computed from measurements through to depth k 1; and kalm_upd.m performs Kalman update of state and covariance at depth k, using measurement vector at depth k. The variables related to the Kalman filter, using the terminology of Harvey, Chapter 4 include:

T, the state transition matrix, c, the state offset vector,

R_t, the state noise matrix,

Q_eta, the state noise covariance,

Z, the measurement matrix, d, the measurement offset,

H, the measurement noise, a0, the initial (no data) Kalman state vector, and

P0, the initial (no data) Kalman covariance matrix.

Given a sequence of measurements and the prior continuity model for a track, the Kalman equations permit evaluation of the likelihood of the measurements forming a track. The target tree data structure can now be constructed.

The target tree is a data structure (strictly speaking not a tree, since it doesn't have a single root node), whose sole purpose is to tabulate the possible sequences of measurements and their likelihoods. The target tree data structure may be visualized as a collection of nodes, some of which are linked together, with the following properties:

each node represents a measurement at some depth;

nodes which are linked represent a sequence of measurements that form a track; and the end nodes represent the start and end of a track. Additional information is stored at each node to enable the computation of track likelihoods. In particular, at each node, the state vector and covariance matrix, updated using the data of nodes at earlier depths, is stored.

Utilizing the MATLAB® software, the target tree data structure is implemented as a cell array, where the first dimension is the node address. The other dimensions represent fields which are stored for each node. These fields include:

parent_index, the node address of the parent node, child_index, the node address of the child node, stvec_index, the state vector, stcov_index, the state covariance matrix, data_index, the data vector [slowness;time]

datavar_index, the data covariance matrix, prob_index, the target likelihood for the current depth, depth_index, the current depth, meas_index, the measurement number of the data value, semb_index, the semblance value, and struct_size, the total number of fields stored in each node.

The parent index and child index fields are used to link the node to nodes at the previous and next depths, which identifies the node with a candidate track or sequence of measurements. Apart from meas_index, the remaining fields are self-explanatory.

The meas_index field refers to the measurement number of the data. The code assumes that data at each depth k is ordered in order of increasing slowness, with the lowest slowness having measurement number 1, and increasing slowness having increasing measurement number, up to a maximum of num_meas, which is the total number of measurements at that depth. If no data are recorded in the current depth, then num_meas is 0, and the measurement number of any node at that depth is 0. If num_meas is greater than 0, it is still possible for a node to correspond to none of the measurements at that depth. It is possible for a track to have missing measurements at a depth. In that case, the convention used is to store a value num_meas+1 in the meas_index field.

To access the parent of the node with an address node, target_tree{node,parent_index} is used. In addition to target_tree and the variables describing the fields of target_tree, three other variables target_leaves, target_freenodes and newtargets are used.

The variable target_leaves is a vector of integers. Each integer is a node which represents data at the most recent depth. Target_leaves is the set of all nodes whose depth is the latest depth at which data have been acquired, and used to update the target tree data structure. In practice, it is not feasible to enumerate all possible sequences of measurements, since the number of possible sequences increases exponentially with the number of measurements. It is necessary to prune the target_tree by discarding some of the possible tracks, as new data is acquired. The variable target_freenodes is a vector of integers, each one representing a node which has been freed by pruning. The variable newtargets is a vector representing the nodes at the most recent depth which initiate new tracks.

An exemplary illustration of the construction of a target_tree is illustrated in FIGS. 6–9. The figures illustrate two measurements at depth 1, three measurements at depth 2, no measurements at depth 3 and one measurement at depth 4. As each depth is acquired, a call to target_tree_upd.m updates the target_tree data structure, updating the set of candidate tracks.

Figure 6:
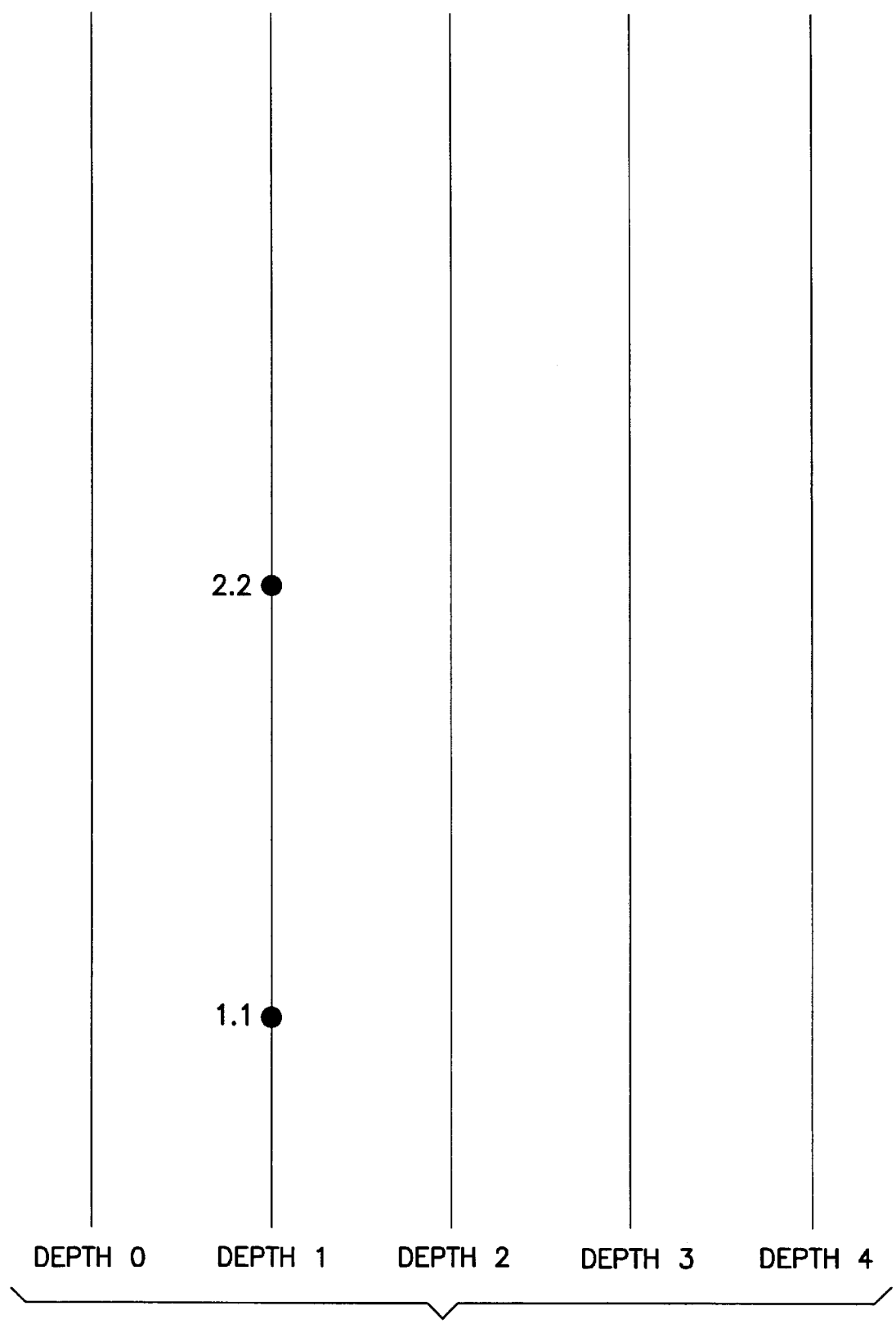
FIGS. 6–9 illustrate the construction of a target tree according to the invention.

At depth 0, no data is processed, and target_tree has the initial value set by the function target_init.m which is set forth in the annotated code listing below.

target_tree=cell(1,struct_size); target_leaves=[]; % The set of leaves (end nodes) of % the target tree structure. Initially there are NO % leaves target_freenodes=[1]; % When a node is discarded, it % is added to the set of freenodes, so that the cell % entry can be used to store the information for the new % node.

target_tree{1,stvec_index}=a0;

target_tree{1,stcov index}=P0;

target_tree{1,depth_index}=0;

target_tree{1,prob_index}=1;

target_tree{1,parent_index}=0;

The first frame at depth 1 is processed, by calling target tree upd.m. The target_leaves variable is empty, and num_meas is 2. If target_leaves is empty, this implies that there are no existing tracks to extend by using the measurements in depth 1. All that can be done is to create two new nodes, as illustrated in FIG. 6, corresponding to the initiation of two new tracks, one starting with measurement 1,1 and the other with measurement 2,2. Two numbers are associated with each node to explain how the structure of the tree is generated. The first number is the node address, which is a unique identifier by which information stored at that node can be accessed. The second number is the measurement number. It is assumed that the measurements at each depth are ordered in order of increasing slowness, with 1 denoting the fastest measurement. Thus in FIG. 6, the 2,2 node, means the node with address 2, which corresponds to the second measurement at depth 1.

After processing the data at depth 1, the target tree data structure contains two nodes, corresponding to two tracks, beginning at measurements 1,1 and 2,2 at depth 1. For each node, Kalman prediction of the state, covariance, mean slowness-time and covariance is performed. For each measurement (in this example the two measurements), it is first checked whether the measurement is within two standard deviations of the 2D Gaussian probability density in the slowness-time plane, predicted by the Kalman filter, as illustrated in the code fragment below.

if (abs((mu-data)'*F^(−1)*(mu-data))<4) \cdots

If the data are not within two standard deviations of the mean slowness-time predicted by the Kalman filter, then no new node corresponding to the measurement is created. If the measurement is within two standard deviations, then a Kalman update and a new node is created to store the updated Kalman state and covariance information, as well as other information about the measurement used to update the Kalman parameters. The information stored in the node can be used to perform Kalman prediction in the next depth, when data at the next depth is considered for extending the track.

Figure 7:
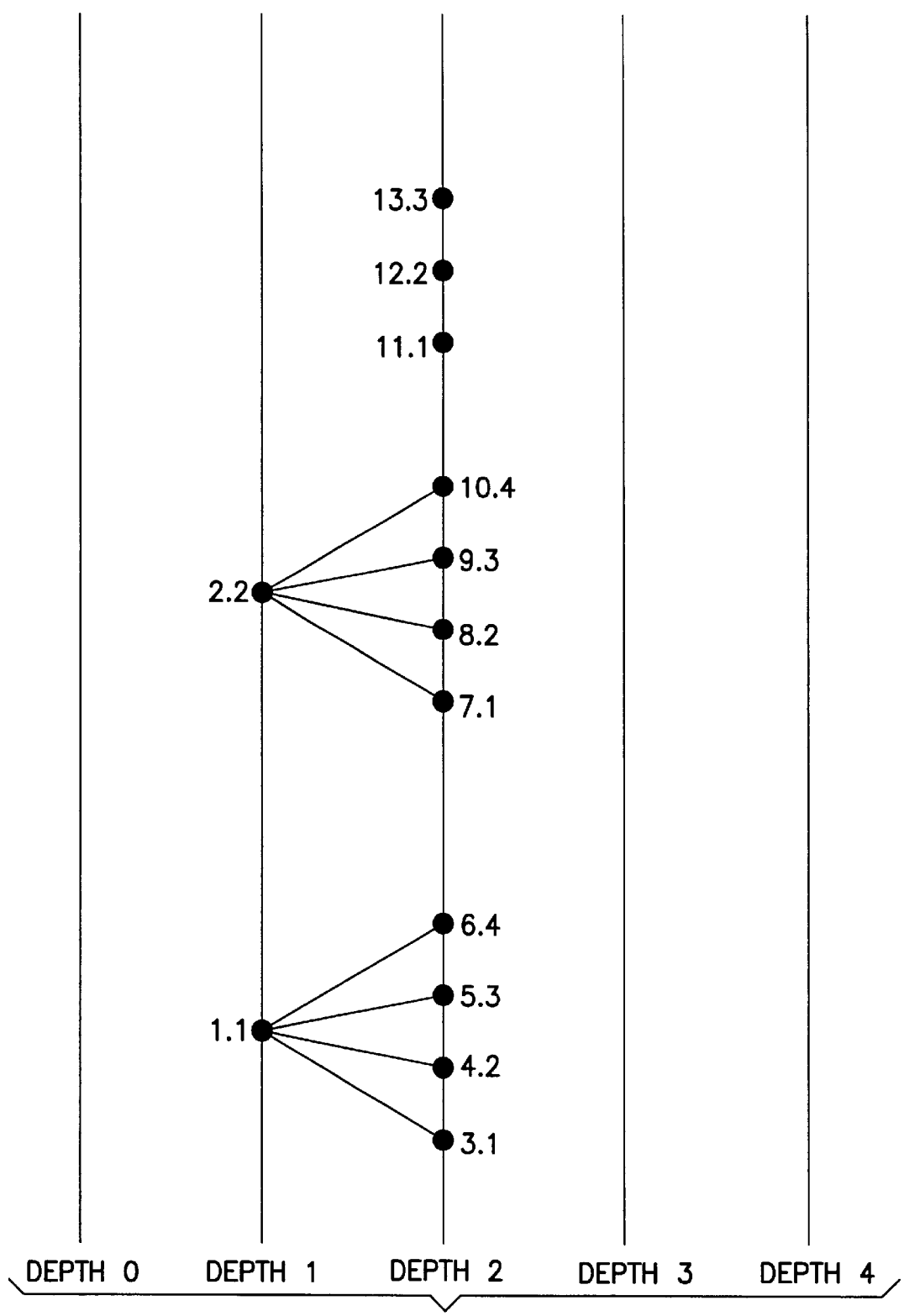

Turning now to FIG. 7, after processing the three measurements at depth 2, each existing track from depth 1 could be extended by any of the three measurements at depth 2. These are shown as the nodes (3,1); (4,2); (5,3), extending from node 1,1 at depth 1 and (7,1); (8,2); (9,3), extending from node 2,2 at depth 1. Each track from depth 1 could also be extended by a missing measurement, i.e., if none of the measurements at depth 2 belong to the tracks from depth 1. These missing measurements are illustrated as nodes (6,4) and (10,4). In addition, the three measurements at depth 2 could be representative of new tracks initiated at depth 2. These nodes are identified as (13,1); (14,2); (15,3).

For each of the nodes (3,1); (4,2); (5,3); (7,1); (8,2); (9,3), Kalman prediction from the previous state is performed, Kalman update using the data in the current frame is completed, and the state-covariance information is stored.

For the nodes (6,4) and (10,4), Kalman prediction is performed, but not a Kalman update, since there is no data to update the state and covariance, as these nodes correspond to missing measurements.

The nodes (13,1); (14,2); (15,3) with no ancestors, corresponding to tracks initiated in depth 2, are created. The Kalman prediction is trivial, since prediction of the initial Kalman state and covariance, a0 and P0 yields the same state and covariance, since the probability model is stationary. After the Kalman update using the measurements at depth 2, the state-covariance information is stored at the new nodes. The code that is executed to create nodes (11,1); (12,2); (13,3) is the same as the code executed to create nodes (1,1); (2,2) described earlier.

Figure 8:
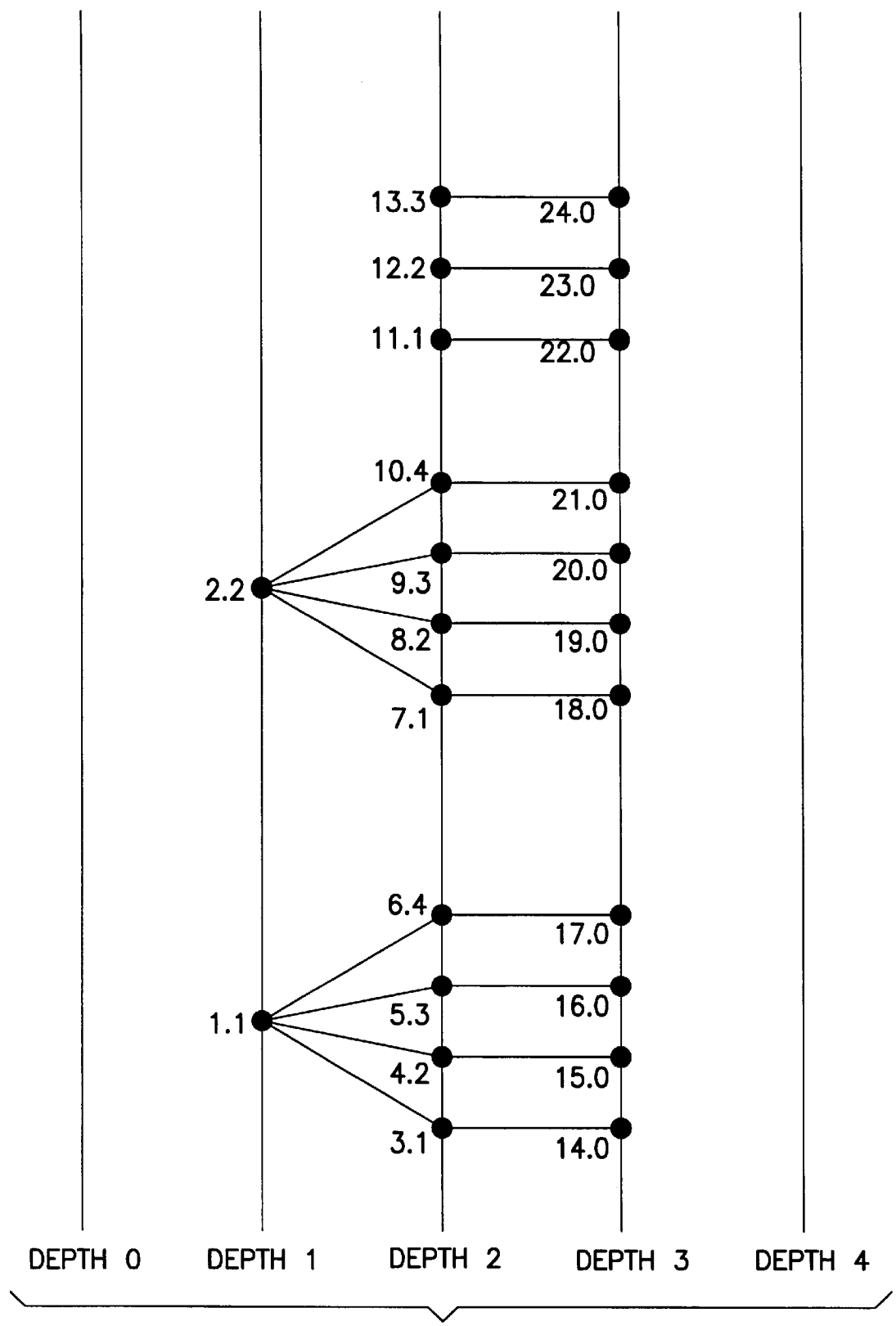

At depth 3 there are no measurements. Therefore, each existing track is extended in only one way. As shown in FIG. 8, a single node is added corresponding to a missing measurement for each existing track, with the meas_index field set to 0. These are nodes (14,0) through to (24,0). No new tracks can be initiated, since there are no measurements to start them.

Figure 9:
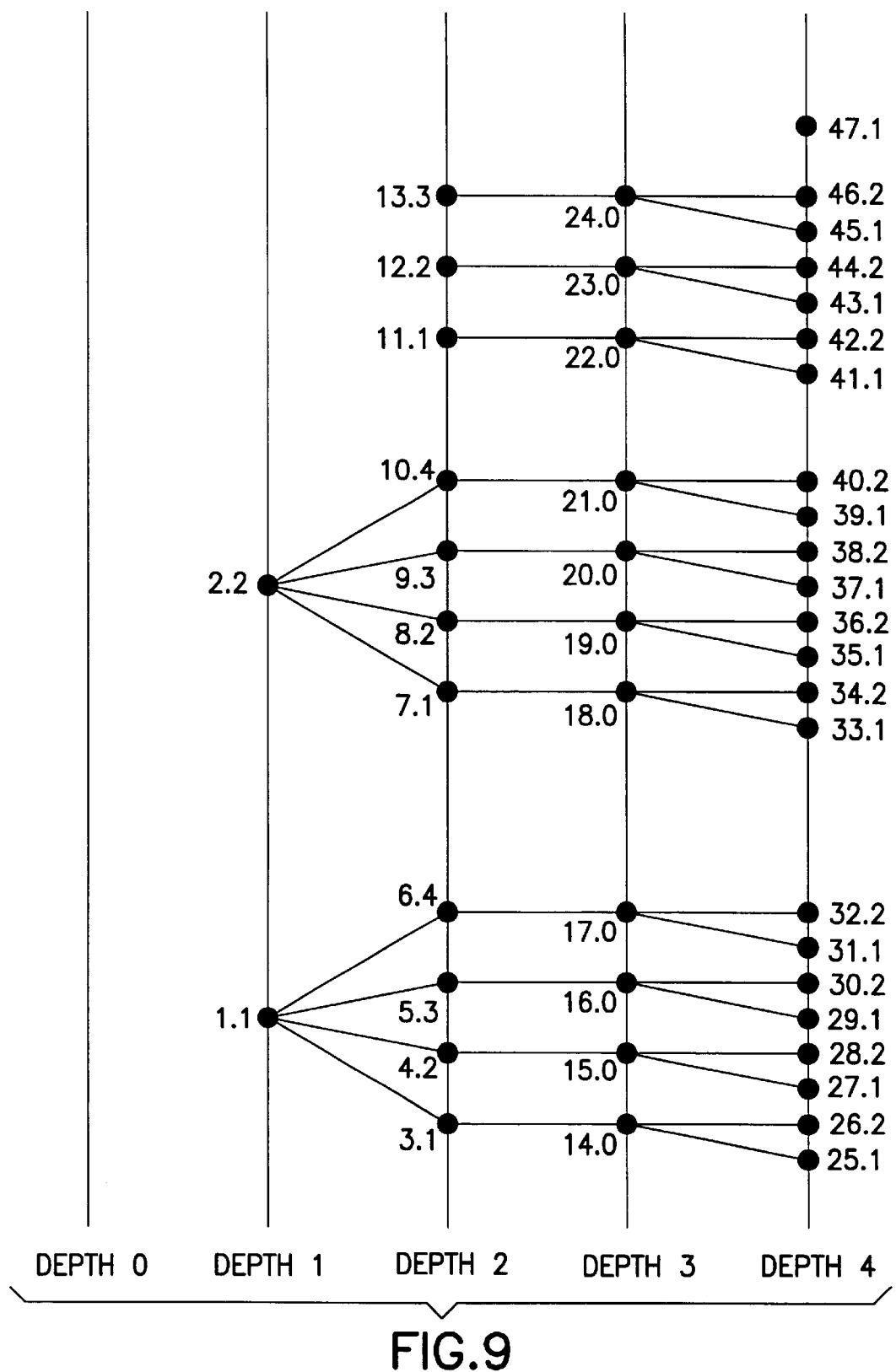

Turning now to FIG. 9, there is one measurement at depth 4. Thus, each existing track can be extended in 2 ways: either the measurement belongs to the track, or the track has a missing measurement at depth 4. In addition, one new track can be initiated in depth 4, starting at node (47,1).

As can be seen from even this simple example, the number of tracks increases very rapidly, and it would be impossible to store all tracks over all depths. In the presently preferred embodiment, low probability tracks are discarded or pruned from the tree, and only nodes over a small depth interval (namely an interval 2depth_interv+1) are kept. This keeps the target tree variable to a manageable size. Two methods of pruning are used. In target_tree_upd.m, if a node is outside two standard deviations of the predicted Kalman mean slowness-time, then it will not be created. A second method of pruning is performed by target_tree_prune.m, which eliminates tracks which are no longer addressed by hypotheses as described in more detail below with regard to the hypothesis tree data structure.

The target_tree data structure provides a way of enumerating the possible sequences of tracks, and the Kalman computations embedded in target_tree_upd.m provide a convenient way of computing data likelihood of a track, given the sequence of measurements that form the track at previous depths. However, the target-tree data structure by itself is not sufficient to specify hypotheses of the type $q_i^k$ referred to in Equation (10). Such an hypothesis provides a complete interpretation for the measurements up through to depth k, whereas target_tree_upd.m provides only a partial interpretation, identifying whether one sequence of measurements may form a track.

Upon completion of the tracking algorithm, therefore, the invention utilizes a classification algorithm to classify the tracks identified by the tracking algorithm. The classification algorithm classifies the tracks using prior probability models. In particular, at each frame, different hypotheses are enumerated, each hypothesis corresponding to a different possible classification of the tracks. The posterior probabilities of the hypotheses for the frame are evaluated, and the most probable hypothesis is selected to classify the tracks.

Utilizing the MATLAB® software, a data structure called hyp_tree is created to enumerate all of the possible hypotheses and an m file hyp_tree_upd.m is created for updating the hypotheses tree. Utilizing the model order and num_meas, the function meashyp.m enumerates all of the different possible hypotheses for a single depth.

Given the number of tracks, modelorder, and a vector of measurement numbers (assuming measurements are ordered in order of increasing slowness), meashyp.m returns the different ways of assigning measurements to the tracks in an array hypotheses. The rule that meashyp.m uses for generating these assignments is to impose the constraint that arrival 1 must be faster than arrival 2, etc. In addition, if a measurement n is assigned to an arrival j, then the only measurements that can be assigned to arrivals j+1 and slower can only be measurements n +1 and slower. Moreover, a measurement can be assigned to one and only arrival.

The hypotheses matrix has i rows of hypotheses and j columns of arrivals. The j-th column of hypotheses represents different assignments of measurements to arrival j. The i-th row of hypotheses is an hypothesis assigning measurements to arrivals. Thus, hypothesis(i,j) represents the measurement number assigned to arrival j, by hypothesis i. Any measurements not mentioned in the hypothesis are assumed to be false alarms. In addition, if hypothesis(i,j) has a value num_meas +1, then none of the measurements is assigned to arrival j.

The function meashyp.m enumerates the different ways in which measurements can be assigned to arrivals. This is not sufficient to specify an hypothesis $q_i(k)$ for the measurements at a particular depth k, since it is not clear how this hypothesis can be linked to an hypothesis for the previous measurements $q_{l(i)}^{k-1}$. To complete the description of an hypothesis, it is necessary to describe how tracks in the current depth k, are related to tracks at the previous depth k−1. It is necessary to understand whether "Track 1" at depth k−1 is the same as "Track 1" at depth k. The process of completing the description of hypotheses in this manner is partially done by meashyp_prevtargets.m and partially in the function hyp_tree upd.m.

The function meashyp_prevtargets.m generates hypotheses for the measurements at a single depth, given the number of measurements, num_meas, the number of tracks at the current depth, modelorder, and the number of tracks at the previous depth, prev_mod_order. There is a dependence upon prev_mod_order because it is necessary to match tracks in the previous depth to tracks at the current depth. If modelorder is the same as prev mod_order, there is no problem of matching tracks, and meashyp_prevtargets.m defaults to meashyp.m. However, when prev_mod_order is less than modelorder, that implies that tracks must be initiated in the current frame. Since new tracks can be slower, or faster, or somewhere in between tracks in the previous frame, the rules for assigning measurements to new tracks are different from those rules used for assigning measurements to existing tracks, so that meashyp.m is no longer sufficient. The function meashyp_prevtargets.m is used in this instance to call hyp_tree_upd.m which is described in detail below. If prev_mod_order is greater than modelorder, this can only happen if tracks in the previous frame are terminated. The process of deciding which tracks continue and which tracks are terminated is handled in hyp_tree upd.m. All that is done by meashyp_prevtargets.m is to reduce to meashyp.m.

The functions meashyp.m and meashyp_prevtargets.m generate hypotheses for measurements at a single depth, given the number of measurements, the current model order and the previous model order. Once the hypotheses at a single depth are generated, it is necessary to assign prior probabilities to them.

The classification algorithm of the invention takes the raw tracks identified by the tracking algorithm and classifies the tracks using prior probability models. At each frame, different hypotheses, corresponding to different possible classifications of the tracks at that frame are enumerated. The posterior probabilities of the hypotheses for the frame are evaluated, and the most probable hypothesis is selected to classify the tracks.

According to the presently preferred embodiment, three different probability models are used for classification: "pessimistic", "forward", and "forward/backward". Pessimistic classification uses only the data in the current frame for classification to compute posterior probability. Forward classification incorporates information provided by all data up to and including the current frame. Forward classification assumes a Markov probability model for the correlation which allows a single update of the posterior probability equation for the current frame to incorporate the information provided by all previous frames. Forward classification can operate in real time with substantially no latency. Forward/backward classification incorporates information from some number of prior frames and some number of subsequent frames. Forward/backward classification uses the same probability model as forward classification, but incorporates data on either side of the current frame by running forward classification in both directions. Forward/backward classification can be run with a latency which depends on the number of frames included in each classification.

For purposes of classification, $D^k$ is used to denote the raw track data in the $k^{th}$ frame. The term $D^k$ includes the model order (the number of tracks identified in the $k^{th}$ frame) as well as the slowness, times, and semblances for each track that has been identified. In addition, it includes, for each track in the current frame, the necessary information linking tracks in the current $k^{th}$ frame to tracks in the previous and next frame, e.g. information such as "track 1 in the $k^{th}$ frame is track 2 in the (k−1)th frame and track 3 in the (k+1)th frame."

As mentioned above, at each frame, hypotheses accounting for the possible classifications of the tracks in that frame are enumerated and their posterior probabilities are calculated. For example, assuming that model orders 0, 1, 2, and 3 are possible in the data, hypotheses for each different model order are used in the posterior probability evaluation. For model order 0, there is only one possible hypothesis, i.e. no arrivals are present to be classified. For model order 1, there is one track. If the logging mode is monopole, then the possible hypotheses are that the track is compressional, shear, or fluid. If the logging mode is dipole, then there are only two hypotheses, i.e. that the track is dipole compressional or dipole shear. As the model order increases, the number of possible hypotheses increases. All reasonable hypotheses are tabulated with their respective prior probabilities and the posterior probabilities are calculated as described below.

The designation $H_j^n$ is used to denote the $j^{th}$ hypothesis at depth n. The posterior probability of $H_j^n$ given the data at frame n−1 and all previous frames is given by Equations (27) and (28).

$$P(H_j^n \mid D^{n-1}, \ldots, D^1) = \sum_k P(H_j^n, H_j^{n-1} \mid D^{n-1}, \ldots, D^1) \quad (27)$$

$$P(H_j^n \mid D^{n-1}, \ldots, D^1) = \sum_k P(H_j^n \mid H_j^{n-1}, D^{n-1}, \ldots, D^1) P(H_j^{n-1} \mid D^{n-1}, \ldots, D^1) \quad (28)$$

The posterior probability of $H_j^n$ given the data at frame n and all previous frames is given by Equation (29).

$$P(H_j^n \mid D^n, \ldots, D^1) = \frac{P(D^n \mid H_j^n, D^{n-1}, \ldots, D^1) P(H_j^n \mid D^{n-1}, \ldots, D^1)}{\sum_k P(D^n \mid H_j^n, D^{n-1}, \ldots, D^1) P(H_j^n \mid D^{n-1}, \ldots, D^1)} \quad (29)$$

Equations (28) and (29) are the basic equations utilized by the Classification Algorithm of the invention. According to the presently preferred embodiment, these Equations are simplified by making some assumptions about the relationship between hypotheses $H_j^n$ and $H_k^{n-1}$ in neighboring frames. One simplifying assumption is that given an hypothesis in a previous frame and the data in all previous frames, an hypothesis in the current frame depends only on the previous hypothesis as illustrated in Equation (30).

$$P(H_j^n \mid H_k^{n-1}, D^{n-1}, \ldots, D^1) = P(H_j^n \mid H_k^{n-1}) \quad (30)$$

Equation (30) assumes that the data correlation for all of the previous frames is entirely captured by the hypothesis for the next previous frame which is thus the only previous hypothesis needed to determine the most probable hypothesis for the current frame. A second simplifying assumption is that the data likelihood in the current frame depends on the previous data only through the hypotheses for the current frame as illustrated in Equation (31).

$$P(D^n \mid H_k^n, D^{n-1}, \ldots, D^1) = P(D^n \mid H_k^n) \quad (31)$$

The assumptions in Equations (30) and (31) are made primarily so that the posterior probability computation simplifies into a forward and backward computation of the data. By making the assumptions in Equations (30) and (31), Equations (28) and (29) simplify to Equations (32) and (33) respectively.

$$P(H_i^n \mid D^{n-1}, \ldots, D^1) = \sum_k P(H_i^n \mid H_j^{n-1}) P(H_j^{n-1} \mid D^{n-1}, \ldots, D^1) \quad (32)$$

$$P(H_j^n \mid D^n, \ldots, D^1) = \frac{P(D^n \mid H_i^n) P(H_i^n \mid D^{n-1}, \ldots, D^1)}{\sum_k P(D^n \mid H_i^n) P(H_i^n \mid {}^{n-1}, \ldots, D^1)} \quad (33)$$

The right hand side of Equation (32) is now reduced to the sum of matrix•vector products where the matrix is the matrix of the conditional probabilities depending only upon the relationships between hypotheses in the current frame and hypotheses in the previous frame, and the vector is the vector of probabilities for the hypotheses in the previous frame. The left hand side of Equation (32) is the vector of prior probabilities for the hypotheses in the current frame. The numerator in the right hand side of Equation (33) is the product of two vectors, the first being the vector of likelihoods and the second vector being the vector of prior probabilities for hypotheses. In order to solve Equations (32) and (33), it is necessary to know how the conditional probabilities and the likelihoods are computed. This is explained below with reference to Equations (34) through (41). All subsequent quantities are computed by iterating Equations (32) and (33) over frames starting with the first frame.

As mentioned above, the hypotheses in the current frame depend inter alia upon the model order (number of tracks) in the current frame. For example, if the model order is one, there are three hypotheses which are expressed as Equations (34)–(36).

$H_1^n=[1]$ means compressional (34)

$H_2^n=[2]$ means shear (35)

$H_3^n=[3]$ means fluid (36)

If the model order is two there can be three hypotheses assuming no dual arrivals. These three hypotheses are illustrated by Equations (37)–(39).

$H_1^n=[1, 2]$ track 1 is compressional track 2 is shear (37)

$H_2^n=[1, 3]$ track 1 is compressional track 2 is fluid (38)

$H_3^n=[2, 3]$ track 1 is shear, track 2 is fluid (39)

It is always assumed that the tracks are ordered by slowness so that, e.g. track 1 is faster than track 2, etc. The number of hypotheses for a frame correspond to the different permutations of the model order. Some permutations are impossible, e.g. where track 2 is faster than track 1, and these permutations are not considered.

In order to assign conditional probabilities, it is recognized that some hypotheses in the current frame will be consistent with hypotheses in the previous frame and others will be inconsistent. For example, if the model order is one for tracks n and n−1, and the tracking algorithm has identified the track in frame n as being the same track as the track in frame n−1, and the track is classified as a shear wave track in frame n−1, the hypothesis that the track in frame n is a shear wave track should be more probable than the hypothesis that it is a compressional wave track or a fluid wave track as illustrated in Equations (40) and (41).

$$P(H_2^n \mid H_2^{n-1}) > P(H_1^n \mid H_2^{n-1}) \quad (40)$$

$$P(H_2^n \mid H_2^{n-1}) > P(H_3^n \mid H_2^{n-1}) \quad (41)$$

Equation (40) states that the probability of the hypothesis that the track in frame n is a shear wave track (type 2 arrival) given that the hypothesis that the track in frame n−1 is a shear wave track is greater than the probability of the hypothesis that the track in frame n is a compressional wave track (type 1 arrival) given that the hypothesis that the track in frame n−1 is a shear wave track. Equation (41) states that the probability of the hypothesis that the track in frame n is a shear wave track (type 2 arrival) given that the hypothesis that the track in frame n−1 is a shear wave track is greater than the probability of the hypothesis that the track in frame n is a fluid wave track (type 3 arrival) given that the hypothesis that the track in frame n−1 is a shear wave track.

One way of assigning conditional probabilities according to the invention is to assign the probability for the hypothesis in frame n given the hypotheses in frame n−1 some constant value K if the hypotheses are consistent and a probability of zero if they are inconsistent. The value of K is determined by the number of consistent hypotheses found. For example, if there are J consistent hypotheses found, then K=1/J, assuming that each consistent hypothesis is equally likely. This way of assigning probabilities assumes that the tracking algorithm is 100% correct. To account for a finite probability that the tracking algorithm has made an error, the value K is set to a parameter between zero and 1 by the classification algorithm.

The model used for the likelihood (the probability of the data given the hypotheses) computations assumes that the tracks are independent of each other. More particularly, the model treats each track as a slowness-time point in a two-dimensional slowness-time plane that is Gaussian distributed. The prior probability for a slowness-time point depends upon the classification assigned to that point by the hypotheses. If the model order is one, then the likelihood is a single two-dimensional Gaussian, evaluated at the slowness-time point given by the data, with the prior mean and variance specified by the hypotheses. If the model order is two or greater, then the likelihood is the product of two two-dimensional Gaussians, each Gaussian being evaluated at a slowness-time point specified by the data, with the prior mean and variance given by the hypotheses.

Utilizing the MATLAB® software, the raw data processed by the classification algorithm, i.e. the tracks found by the tracking algorithm, are stored in the chain data structure, details of which are described below. The "Forward" Classification is implemented in forwardprobcalc.m and forwardprob1frame.m. The former performs "Forward" Classification all at once after tracking is completed. On the other hand, forwardprob1frame.m performs "Forward" Classification while tracking, one frame at a time, incorporating the information provided by past frames. The function reverseprobcalc.m performs "Backward" Classification on the entire data set, all at once, after "Forward" Classification has finished.

The chain data structure is the common data structure on which all classification operations are performed. It is output by the tracking algorithm, and initially, it sets the prior probabilities for the hypotheses at each frame to default values. "Forward" classification operates on the chain data structure, and updates the probabilities by the new posterior probabilities, computed from the past data likelihood and the priors. "Backward" classification updates the probabilities a second time, incorporating information from future data likelihood and the probabilities from "Forward" Classification.

The fields of the chain data structure are reproduced below with remarks on the relationship to the general equations for Classification chain—chain data structure output by the tracking algorithm. This has the same fields as the hyp_tree data structure but only the following are used:

hyp_mod_ord_index chain{frame,hyp_mod_ord_index} is the model order or number of tracks found by the tracking algorithm at the current depth. The model order determines the possible classifications, which can be read from the array of possibles{modelorder+1}.

hyp_prob_index—the posterior probabilities of the possible classifications are stored here and used for the forward/backward probability computation.

hyp_tdata_index—the target slownesses and times are stored here chain{frame,hyp_tdata_index} is a 2 by modelorder array.

chain{frame,hyp_tdata_index} (1,:) is the set of slownesses, and chain{frame,hyp_tdata_index} (2,:) is the set of times hyp_tchild_index—describes how measurements in the CURRENT frame are linked to measurements in the NEXT frame by tracks.

chain{frame,hyp_tchild_index} (i) is the measurement number in the NEXT frame that is linked to measurement i in the CURRENT frame.

hyp_tparent_index—describes how measurements in the CURRENT frame are linked to measurements in the PREVIOUS frame by tracks.

chain{frame,hyp_tparent_index} (i) is the measurement number in the PREVIOUS frame that is linked to measurement i in the CURRENT frame hyp_pessim_prob_index is used for the PESSIMISTIC classification. The vector of posterior probabilities when the pessimistic classification is used are stored here The variable chain{frame,hyp_mod_ord_index} is an integer representing the model order in the current frame. This determines the appropriate set of hypotheses to use in classification, which are stored in the cell array of possibles. For instance possibles{modelorder+1} represents the hypotheses for modelorder, e.g., possibles{3} is an array of a form similar to Equations (37) through (39) representing the hypotheses for model order 2.

A vector of probabilities is stored in chain{frame,hyp_mod_ord_index}. Just after chain is output by the tracking algorithm, the probabilities stored are the default prior probabilities for the hypotheses in the current frame. After "Forward" Classification is run, it contains the probabilities representing posterior probabilities for hypotheses in the current frame n, given the past data before frame n. Once "Backward" classification is run, it contains the posterior probability given all the data, where $D^N$ represents the last data frame.

The field hyp_tdata_index is used to store the actual slowness-time values of the data in the current frame. The information about which track in the current frame corresponds to tracks in the previous and subsequent frames is stored in the fields hyp tparent_index and hyp_tchild_index respectively.

Figure 10:
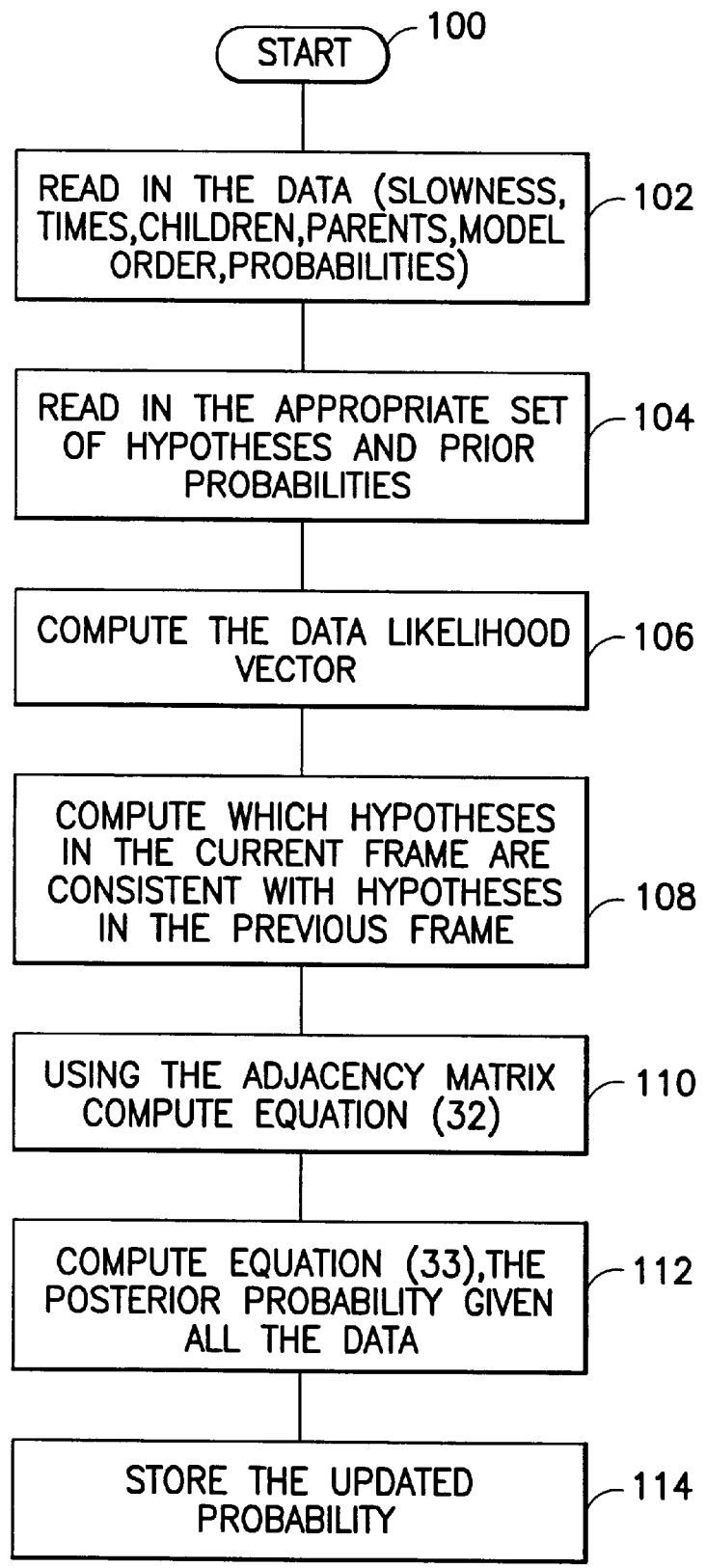
FIG. 10 is a simplified flow chart illustrating the steps in forward classification.

Turning now to FIG. 10, the sequence of operations that is followed by forwardprob1frame.m (forwardprobcalc.m just loops over depth) is as follows: starting at 100, data (slowness, times, children, parents, model order, probabilities) are read at 102. The appropriate set of hypotheses and prior probabilities are read at 104. At 106, the data likelihood vector (Equation (33) is computed. This is done by likelicompute.m. At 108, the method computes which hypotheses in the current frame are consistent with hypotheses in the previous frame. This is done by adjmatrix.m, which computes an adjacency matrix. If there are I hypotheses in current frame n and J hypotheses in the previous frame n−1, then the adjacency matrix A is an I×J matrix of 1's and 0's, where $[A]_{ij}=1$ if the hypothesis in the current frame is consistent with the hypothesis in the previous frame and 0 otherwise. Using the adjacency matrix, Equation (32) is computed at 110. Equation (33), the posterior probability given ALL the data, is computed at 112 and the updated probability is stored at 114.

Figure 11:
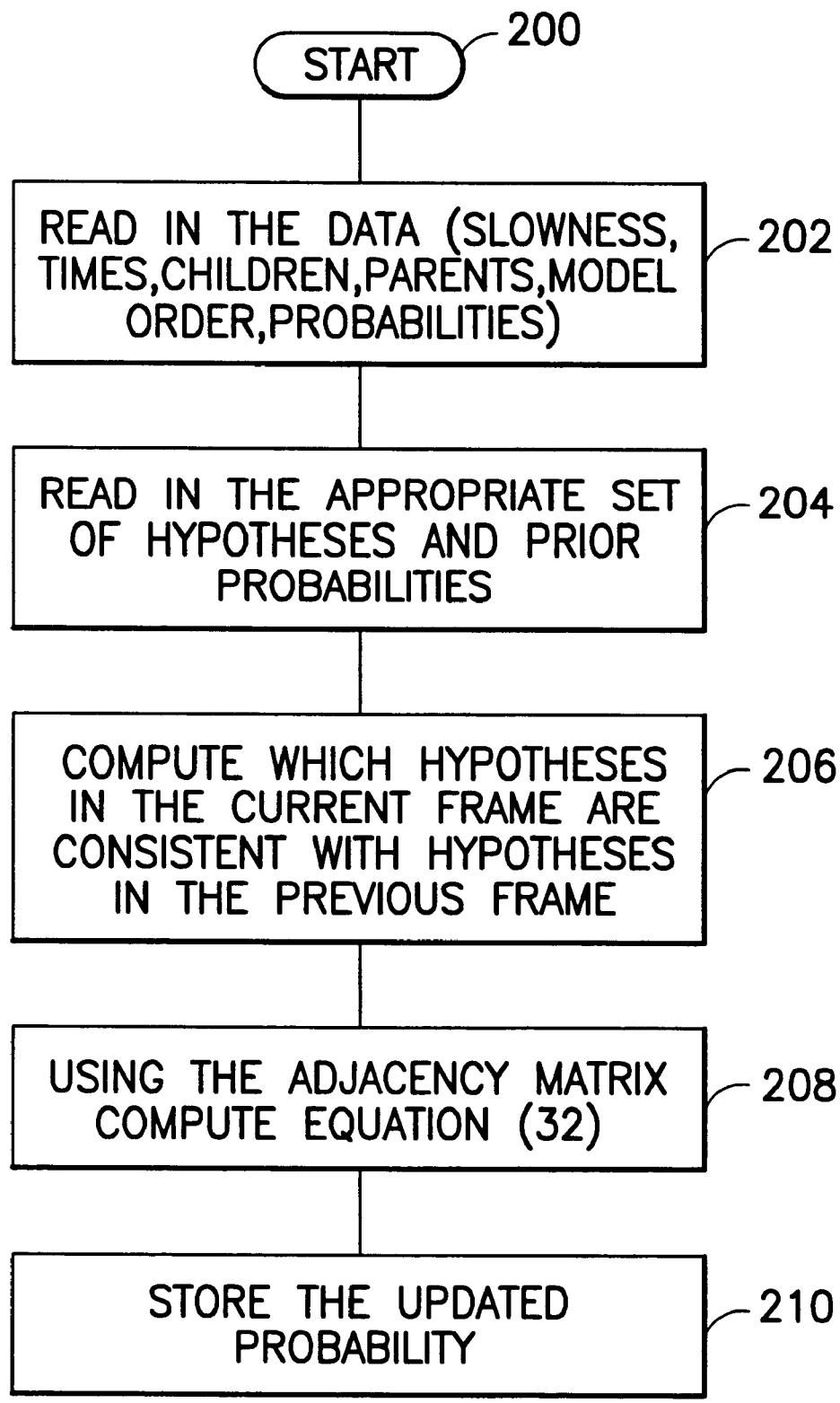
FIG. 11 is a simplified flow chart illustrating the steps in backward classification.

Turning now to FIG. 11, the sequence of steps for "Backward" Classification is very similar, except that data likelihoods don't need to be computed. By assumption of the probability model, the data dependence is reflected entirely in the relationship between hypotheses. "Backward" Classification merely propagates the information from future data by computing which hypotheses are consistent, and appropriately multiplying by a matrix determined from the adjacency matrix. As shown in FIG. 11, starting at 200, the data (slowness, times, children, parents, model order, probabilities) are read at 202. The appropriate set of hypotheses and prior probabilities are read at 204. At 206, the method computes which hypotheses in the current frame are consistent with hypotheses in the previous frame. This is done by adjmatrix.m, which computes an adjacency matrix as described above. Using the adjacency matrix, Equation 32 is computed at 208. The updated probability is stored at 210.

There have been described and illustrated herein methods for downhole waveform tracking and sonic labeling (classification). While particular embodiments of the invention have been described, it is not intended that the invention be limited thereto, as it is intended that the invention be as broad in scope as the art will allow and that the specification be read likewise. Although the methods of the invention are described with reference to sonic labeling, they may be applied to other well-logging applications as well. For example, the invention may be applied to seismic autotracking of waveform arrivals and reflections in seismic imaging, tracking features in images (e.g. FMI images) for detection and identification of bedding and dip computation, and well-to-well correlation. In addition, while the invention has been described with reference to particular software code, other software code could be used to accomplish the same results. Further, while certain simplifying assumptions have been made with respect to the last term in Equation (10), the independence of certain variables, the relationship between hypotheses in adjacent frames, the data likelihood in the current frame, etc., it will be appreciated that one or more of these assumptions need not be made, or that other simplifying assumptions might be made. It will therefore be appreciated by those skilled in the art that yet other modifications could be made to the provided invention without deviating from its spirit and scope as so claimed.

What is claimed is:

1. A method for downhole waveform tracking and sonic labeling (classification), said method comprising:
   a) logging waveform arrival data at a plurality of depths k;
   b) mapping the continuity of the data tracks as a function of slowness or time over depth;
   c) building a probability model of the likely classification of the tracks based on said mapping;
   d) evaluating the probability model with Bayesian analysis to determine the most likely classifications of the tracks.

2. A method according to claim 1, wherein:
   said step of logging waveform arrival data includes recording sonic measurements $C_k$ at each depth and recording the number $N_k$ of recorded measurements at each depth.

3. A method according to claim 2, wherein:
said step of building a probability model includes building a model based on $C_k$ and building a separate model based on $N_k$.

4. A method according to claim 3, wherein:
said step of building a model based on $N_k$ includes, for each depth,
i) ranking tracks in increasing order of slowness,
ii) creating a first matrix of tracks x sonic measurements, and
iii) assigning a probability to each cell in the first matrix.

5. A method according to claim 4, wherein:
said step of assigning a probability to each cell in the first matrix is based on the total number $N_k$ of recorded measurements, the number 0 of those measurements which appear to be a part of observed tracks and the number $N_k-0$ of false alarms.

6. A method according to claim 5, wherein:
the number $N_k-0$ of false alarms is modeled as a Poisson distribution with a known mean.

7. A method according to claim 4, wherein:
said step of building a model based on $N_k$ includes, for each depth after a first depth,
i) creating a second matrix of previous depth tracks x current depth tracks, and
ii) assigning a probability to each cell in the second matrix.

8. A method according to claim 7, wherein:
said step of assigning a probability to each cell in the second matrix is based on classifications, track assignments, and the probabilities in the first matrix.

9. A method according to claim 7, wherein:
said step of building a model based on $N_k$ includes building a single model of hypotheses and data likelihood based on the first and second matrices.

10. A method according to claim 3, wherein:
said step of building a model based on $C_k$ includes building a model based on the coordinates of each slowness-time peak derived from the waveforms.

11. A method according to claim 10, wherein:
said step of building a model based on $C_k$ includes filtering slowness-time coordinates through a Kalman filter.

12. A method according to claim 11, wherein:
said step of building a model based on $C_k$ includes correlating slowness across depth as the output of an ARMA filter with known coefficients driven by white Gaussian noise.

13. A method according to claim 11, wherein:
said step of building a model based on $C_k$ includes modeling each slowness-time pair as a two-dimensional vector.

14. A method according to claim 13, wherein:
said step of filtering slowness-time coordinates through a Kalman filter includes filtering the slownesses through a one-dimensional Kalman filter and filtering the times through a separate one-dimensional Kalman filter.

15. A method according to claim 1, wherein:
said step of evaluating the probability model with Bayesian analysis uses only the data in the current depth for classification to compute posterior probability.

16. A method according to claim 1, wherein:
said step of evaluating the probability model with Bayesian analysis incorporates information provided by all data up to and including the current depth.

17. A method according to claim 1, wherein:
said step of evaluating the probability model with Bayesian analysis incorporates information from a fixed number of prior depths and a fixed number of subsequent depths relative to the current depth.

18. A method according to claim 1, wherein:
said step of evaluating the probability model with Bayesian analysis assumes that the probabilities of classifications at depth k, given the probabilities of classifications at depth k−1 and data from depths 1 through k−1, depends only on the probabilities of classifications at depth k−1.

19. A method according to claim 1, wherein:
said step of evaluating the probability model with Bayesian analysis assumes that the data likelihood at the current depth depends on the previous data only through the probable classifications at the current depth.

20. A method for downhole waveform tracking, said method comprising:
a) logging waveform arrival data at a plurality of depths k; and
b) mapping the continuity of the data as a function of depth utilizing a probability model of the likelihood that data at one depth represents the same waveform arrival as data at other depths.

21. A method according to claim 20, wherein:
said step of logging waveform arrival data includes recording measurements $C_k$ at each depth and recording the number $N_k$ of recorded measurements at each depth.

22. A method according to claim 21, wherein:
said step of utilizing a probability model includes building a model based on $C_k$ and a separate model based on $N_k$.

23. A method according to claim 22, wherein:
the waveforms are sonic waveforms, and said step of building a model based on $N_k$ includes, for each depth,
i) ranking tracks in increasing order of slowness,
ii) creating a first matrix of tracks x sonic measurements, and
iii) assigning a probability to each cell in the first matrix.

24. A method according to claim 23, wherein:
said step of assigning a probability to each cell in the first matrix is based on the total number $N_k$ of recorded measurements, the number 0 of those measurements which appear to be a part of observed tracks and the number $N_k-0$ of false alarms.

25. A method according to claim 24, wherein:
the number $N_k-0$ of false alarms is modeled as a Poisson distribution with a known mean.

26. A method according to claim 23, wherein:
said step of building a model based on $N_k$ includes, for each depth after a first depth,
i) creating a second matrix of previous depth tracks x current depth tracks, and
ii) assigning a probability to each cell in the second matrix.

27. A method according to claim 26, wherein:
said step of assigning a probability to each cell in the second matrix is based on track assignments and the probabilities in the first matrix.

28. A method according to claim 26, wherein:
said step of building a model based on $N_k$ includes building a single model of hypotheses and data likelihood based on the first and second matrices.

29. A method according to claim 22, wherein:

the waveforms are sonic waveforms; and said step of building a model based on $C_k$ includes building a model based on the coordinates of each slowness-time peak derived from the waveforms.

30. A method according to claim 29, wherein:

said step of building a model based on $C_k$ includes filtering slowness-time coordinates through a Kalman filter.

31. A method according to claim 30, wherein:

said step of building a model based on $C_k$ includes correlating slowness across depth as the output of an ARMA filter with known coefficients driven by white Gaussian noise.

32. A method according to claim 30, wherein:

said step of building a model based on $C_k$ includes modeling each slowness-time pair as a two-dimensional vector.

33. A method according to claim 30, wherein:

said step of filtering slowness-time coordinates through a Kalman filter includes filtering the slownesses through a one-dimensional Kalman filter and filtering the times through a separate one-dimensional Kalman filter.

* * * * *